United States Patent
Kagami et al.

(10) Patent No.: US 7,832,085 B2
(45) Date of Patent: Nov. 16, 2010

(54) METHOD OF MANUFACTURING MAGNETIC HEAD AND METHOD OF MANUFACTURING MAGNETIC HEAD SUBSTRUCTURE

(75) Inventors: Takeo Kagami, Tokyo (JP); Tetsuro Sasaki, Tokyo (JP); Yuichi Watabe, Tokyo (JP); Takamitsu Sakamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 432 days.

(21) Appl. No.: 12/005,272

(22) Filed: Dec. 27, 2007

(65) Prior Publication Data

US 2008/0222879 A1    Sep. 18, 2008

Related U.S. Application Data

(63) Continuation-in-part of application No. 11/723,127, filed on Mar. 16, 2007.

(51) Int. Cl.
*G11B 5/127* (2006.01)
*H04R 31/00* (2006.01)

(52) U.S. Cl. ............. 29/603.16; 29/603.07; 29/603.13; 29/303.14; 29/603.15; 29/603.18; 205/199; 205/122; 360/121; 360/122; 360/317; 428/811; 428/815; 428/816

(58) Field of Classification Search ............ 29/603.07, 29/603.13–603.16, 603.18; 205/119, 122; 360/121, 122, 317; 428/811.5, 815, 816; 451/5, 41
See application file for complete search history.

(56) References Cited

U.S. PATENT DOCUMENTS

| | | | |
|---|---|---|---|
| 6,212,761 B1 | 4/2001 | Yoshida et al. | |
| 6,515,475 B2 * | 2/2003 | Goubau et al. | 29/603.09 X |
| 6,728,065 B2 | 4/2004 | Batra et al. | |
| 6,751,844 B2 * | 6/2004 | Pinarbasi | 29/603.14 |
| 6,810,578 B1 * | 11/2004 | Sasaki et al. | 29/603.15 |
| 6,842,308 B1 | 1/2005 | Pust et al. | |

(Continued)

FOREIGN PATENT DOCUMENTS

JP    61003482 A  *  1/1986

(Continued)

OTHER PUBLICATIONS

Mar. 25, 2010 Office Action issued in U.S. Appl. No. 11/723,127.

*Primary Examiner*—Paul D Kim
(74) *Attorney, Agent, or Firm*—Oliff & Berridge, PLC

(57) ABSTRACT

A method of manufacturing a magnetic head includes the steps of: fabricating a substructure in which pre-head portions are aligned in a plurality of rows by forming components of a plurality of magnetic heads on a single substrate; and fabricating the plurality of magnetic heads by separating the pre-head portions from one another through cutting the substructure. In the step of fabricating the substructure, the resistance of an MR film that will be formed into an MR element by undergoing lapping later is detected to determine the target position of the boundary between a track width defining portion and a wide portion of a pole layer based on the resistance detected, and the pole layer is thereby formed. In the step of fabricating the magnetic heads, the surface formed by cutting the substructure is lapped such that the MR film is lapped and the resistance thereof thereby reaches a predetermined value.

22 Claims, 24 Drawing Sheets

U.S. PATENT DOCUMENTS

| | | |
|---|---|---|
| 6,884,148 B1 * | 4/2005 | Dovek et al. .................. 451/5 |
| 6,989,963 B2 | 1/2006 | Kautzky et al. |
| 7,042,682 B2 | 5/2006 | Hu et al. |
| 7,126,788 B1 | 10/2006 | Liu et al. |
| 7,126,790 B1 | 10/2006 | Liu et al. |
| 2005/0237665 A1 | 10/2005 | Guan et al. |
| 2005/0237673 A1 | 10/2005 | Mizoguchi et al. |
| 2006/0028770 A1 | 2/2006 | Etoh et al. |
| 2006/0203384 A1 | 9/2006 | Maruyama et al. |

FOREIGN PATENT DOCUMENTS

| | | | |
|---|---|---|---|
| JP | 09022509 A | * | 1/1997 |
| JP | A-09-022509 | | 1/1997 |
| JP | A 11-134614 | | 5/1999 |
| JP | A 2005-122887 | | 5/2005 |
| JP | A 2005-310363 | | 11/2005 |
| JP | A 2005-317069 | | 11/2005 |
| JP | A 2006-48806 | | 2/2006 |
| JP | 2006155789 A | * | 6/2006 |
| JP | A 2006-252620 | | 9/2006 |

* cited by examiner

METHOD OF MANUFACTURING MAGNETIC HEAD AND METHOD OF MANUFACTURING MAGNETIC HEAD SUBSTRUCTURE

BACKGROUND OF THE INVENTION

1. Field of the Invention

The present invention relates to a method of manufacturing a magnetic head used for writing data on a recording medium and reading data stored on the recording medium, and a method of manufacturing a magnetic head substructure used in the method of manufacturing the magnetic head.

2. Description of the Related Art

For magnetic read/write devices such as magnetic disk drives, higher recording density has been constantly required to achieve a higher storage capacity and smaller dimensions. Typically, magnetic heads used in magnetic read/write devices are those having a structure in which a reproducing (read) head having a magnetoresistive element (that may be hereinafter called an MR element) for reading and a recording (write) head having an induction-type electromagnetic transducer for writing are stacked on a substrate.

For read heads, GMR (giant magnetoresistive) elements utilizing a giant magnetoresistive effect have been practically used as MR elements. Conventional GMR elements have a current-in-plane (CIP) structure in which a current used for detecting magnetic signals (that is hereinafter called a sense current) is fed in the direction parallel to the plane of each layer making up the GMR element. Recently, there has been proposed another type of GMR element having a current-perpendicular-to-plane (CPP) structure in which the sense current is fed in a direction intersecting the plane of each layer making up the GMR element, such as the direction perpendicular to the plane of each layer making up the GMR element. TMR elements utilizing a tunneling magnetoresistive effect are also known as another type of MR element. The TMR elements have a CPP structure, too. To achieve higher recording density of magnetic read/write devices, MR elements have been recently shifted from conventional GMR elements having the CIP structure to TMR elements or GMR elements having the CPP structure.

Write heads include those of a longitudinal magnetic recording system wherein signals are magnetized in the direction along the surface of the recording medium (the longitudinal direction) and those of a perpendicular magnetic recording system wherein signals are magnetized in the direction perpendicular to the surface of the recording medium. Recently, the shift from the longitudinal magnetic recording system to the perpendicular magnetic recording system has been promoted in order to achieve higher recording density of magnetic read/write devices.

In each of the longitudinal and perpendicular magnetic recording systems, the write head typically incorporates a coil for generating a magnetic field corresponding to data to be written on a recording medium, and a pole layer for allowing a magnetic flux corresponding to the magnetic field generated by the coil to pass therethrough and generating a write magnetic field for writing the data on the recording medium. The pole layer includes a track width defining portion and a wide portion, for example. The track width defining portion has a first end located in a medium facing surface and a second end located away from the medium facing surface, and has a width that defines the track width. The wide portion is coupled to the second end of the track width defining portion and has a width greater than the width of the track width defining portion. Here, the length of the track width defining portion taken in the direction orthogonal to the medium facing surface is called a neck height. The neck height exerts influences on write characteristics such as an overwrite property.

An example of a method of manufacturing a magnetic head will now be described. In the method, first, components of a plurality of magnetic heads are formed on a single substrate (wafer) to thereby fabricate a magnetic head substructure in which pre-head portions each of which will be the magnetic head later are aligned in a plurality of rows. The substructure includes a plurality of magnetoresistive films (hereinafter referred to as MR films) each of which will be formed into an MR element by undergoing lapping later. Each of the MR films has such a shape that the length taken in the direction orthogonal to the medium facing surface is greater than the length of the MR element and that the width is equal to the width of the MR element. Next, the substructure is cut into a plurality of head aggregates each of which includes a plurality of pre-head portions aligned in a row. Next, a surface formed in each of the head aggregates by cutting the substructure is lapped to thereby form the medium facing surface for each of the plurality of pre-head portions included in each of the head aggregates. At this time, each of the MR films is lapped, so that the length thereof reaches a predetermined length and the resistance thereof reaches a predetermined value, and as a result, the MR films are formed into the MR elements. Next, flying rails are formed on the medium facing surfaces. Next, each of the head aggregates is cut so that the plurality of pre-head portions are separated from one another, whereby a plurality of magnetic heads are formed.

An example of a method of forming the medium facing surface by lapping the head aggregate will now be described. In the method, a plurality of resistor layers are formed in advance on the substructure, each of the resistor layers having a resistance that changes with changing amount of lapping when the head aggregate is lapped later. The resistance of each of the resistor layers has a correspondence with the resistance of the MR element. When the head aggregate is lapped, lapping is performed while detecting the resistances of the plurality of resistor layers so that the resistance of each of the plurality of resistor layers is of a predetermined value. As a result, the medium facing surfaces are formed such that the resistance of each of the plurality of MR elements is equal to the target value thereof and that each of MR heights is equal to the target value thereof. The MR height is the length of the MR element taken in the direction orthogonal to the medium facing surface. Such a method of forming the medium facing surfaces as described above is disclosed in JP 11-134614A or JP 2005-317069A, for example.

JP 2006-048806A discloses a technique of optimizing both the throat height of the write head and the element height of the read head by performing processing of an air bearing surface using a processing detection pattern for controlling the throat height of the write head and a processing detection pattern for controlling the element height of the read head. JP 2006-048806A mentions that throat height here means length from the air bearing surface to the point (flare point) at which the width of the track width portion of the main pole begins to widen. The "throat height" mentioned in JP 2006-048806A therefore actually means neck height. The term "element height" appearing in JP 2006-048806A means the same as MR height, and the term "air bearing surface" appearing in JP 2006-048806A means the same as the medium facing surface.

In the conventional method of manufacturing a magnetic head, the substructure is fabricated such that there is a specific positional relationship between the MR film and the pole layer. Therefore, ideally, if the medium facing surfaces are formed such that each of the MR heights is of a specific value, uniform MR heights are thereby obtained.

If there is no variation in resistance-area product (RA) and width of the MR film among a plurality of substructures, it is possible to form MR elements through the above-described method of forming medium facing surfaces, such that the resistance of each of the MR elements is equal to the target value thereof and that each of the MR heights is equal to the target value thereof. In practice, however, there are some cases in which variations occur in resistance-area product and width of the MR film among a plurality of substructures. Even in such cases, it is possible to make the resistances of the MR elements uniform by performing lapping such that the resistance of each of the MR elements is equal to the target value. However, in the cases in which variations occur in resistance-area product and width of the MR film, if the MR elements are formed such that the resistances of the MR elements are uniform, there occur variations in MR height. In the case in which the MR film and the pole layer are formed to have a specific positional relationship with each other as previously described, if there occur variations in MR height, there occur variations in neck height, too.

Conventionally, in the case of write heads of the longitudinal magnetic recording system, when the recording density is low, variations in neck height do not exert great influences on write characteristics such as an overwrite property. However, as the recording density is increased, variations in neck height exert greater influences on write characteristics. In the case of write heads of the perpendicular magnetic recording system, variations in neck height exert greater influences on write characteristics, compared with write heads of the longitudinal magnetic recording system. Because of the foregoing, it has been required recently to reduce variations in neck height so as to obtain desired write characteristics.

The technique disclosed in JP 2006-048806A allows optimization of both the neck height and the throat height. According to this technique, however, the following problems are encountered when variations occur in resistance-area product and width of the MR films as mentioned above. First, in the case where the MR elements are formed such that the MR heights are uniform, there occurs a problem that the resistances of the MR elements vary in response to the variations in resistance-area product and width of the MR films. On the other hand, in the case where the MR elements are formed such that the resistances of the MR elements are uniform, the MR heights vary in response to the variations in resistance-area product and width of the MR films. In this case, since the MR heights vary while the neck heights are uniform, there occurs variations in angle formed by the medium facing surface with respect to the top surface of the substrate. The technique disclosed in JP 2006-048806A further has a disadvantage that the processing on the air bearing surface is complicated because it requires use of both the detection pattern disposed at a height corresponding to the read head and the detection pattern disposed at a height corresponding to the write head.

OBJECT AND SUMMARY OF THE INVENTION

It is an object of the present invention to provide a method of manufacturing a magnetic head capable of reducing variations in both the resistance of a magnetoresistive element and the neck height of a pole layer, and to provide a method of manufacturing a magnetic head substructure used in the method of manufacturing the magnetic head.

A magnetic head manufactured through a first or second method of manufacturing a magnetic head of the invention includes: a medium facing surface that faces toward a recording medium; a magnetoresistive element having an end located in the medium facing surface and reading data stored on the recording medium; a coil that generates a magnetic field corresponding to data to be written on the recording medium; and a pole layer that allows a magnetic flux corresponding to the magnetic field generated by the coil to pass therethrough and generates a write magnetic field for writing the data on the recording medium. The pole layer includes: a track width defining portion including a first end located in the medium facing surface and a second end located away from the medium facing surface, and having a width that defines a track width; and a wide portion coupled to the second end of the track width defining portion and having a width greater than that of the track width defining portion. The magnetic head may be one used for a perpendicular magnetic recording system.

The first method of manufacturing the magnetic head of the invention includes the steps of: fabricating a magnetic head substructure in which a plurality of pre-head portions each of which will be the magnetic head later are aligned in a plurality of rows, by forming components of a plurality of magnetic heads on a substrate; and fabricating the plurality of magnetic heads by separating the pre-head portions from one another through cutting the substructure. The step of fabricating the substructure includes the steps of forming a magnetoresistive film that will be formed into the magnetoresistive element by undergoing lapping later; detecting a resistance of the magnetoresistive film; determining a target position of a boundary between the track width defining portion and the wide portion of the pole layer based on the resistance of the magnetoresistive film detected; and forming the pole layer such that an actual position of the boundary between the track width defining portion and the wide portion coincides with the target position. The step of fabricating the magnetic heads includes the step of forming the medium facing surface by lapping a surface formed by cutting the substructure. In the step of forming the medium facing surface, the lapping is performed such that the magnetoresistive film is lapped and the resistance thereof thereby reaches a predetermined value, and as a result, the magnetoresistive film is formed into the magnetoresistive element.

In the first method of manufacturing the magnetic head of the invention, in the step of detecting the resistance of the magnetoresistive film, the resistance of the magnetoresistive film may be detected while a magnetic field is applied to the magnetoresistive film.

In the first method of manufacturing the magnetic head of the invention, the magnetoresistive film may include: a pinned layer having a fixed direction of magnetization; a free layer having a direction of magnetization that changes in response to an external magnetic field; and a spacer layer disposed between the pinned layer and the free layer. In this case, in the step of detecting the resistance of the magnetoresistive film, the resistance of the magnetoresistive film may be detected with the direction of magnetization of the free layer rendered parallel to the direction of magnetization of the pinned layer by applying a magnetic field to the magnetoresistive film.

The second method of manufacturing the magnetic head of the invention includes the steps of: fabricating a magnetic head substructure in which a plurality of pre-head portions each of which will be the magnetic head later are aligned in a plurality of rows, by forming components of a plurality of magnetic heads on a substrate; and fabricating the plurality of magnetic heads by separating the pre-head portions from one another through cutting the substructure. The step of fabricating the substructure includes the steps of forming a magnetoresistive film that will be formed into the magnetoresistive element by undergoing lapping later; detecting a value of a parameter having a correspondence with a resistance of the magnetoresistive film; determining a target position of a boundary between the track width defining portion and the wide portion of the pole layer based on the value of the parameter detected; and forming the pole layer such that an actual position of the boundary between the track width defining portion and the wide portion coincides with the target position. The step of fabricating the magnetic heads includes the step of forming the medium facing surface by lapping a surface formed by cutting the substructure. In the step of forming the medium facing surface, the lapping is performed such that the magnetoresistive film is lapped and the resistance thereof thereby reaches a predetermined value, and as a result, the magnetoresistive film is formed into the magnetoresistive element.

In the second method of manufacturing the magnetic head of the invention, the step of fabricating the substructure may further include the step of forming a detection element having a resistance-area product equal to that of the magnetoresistive film, and, in the step of detecting the value of the parameter, a value of the resistance-area product of the detection element may be detected as the value of the parameter. In this case, the value of the resistance-area product of the detection element may be detected while a magnetic field is applied to the detection element.

In the second method of manufacturing the magnetic head of the invention, each of the magnetoresistive film and the detection element may include: a pinned layer having a fixed direction of magnetization; a free layer having a direction of magnetization that changes in response to an external magnetic field; and a spacer layer disposed between the pinned layer and the free layer. In this case, in the step of detecting the value of the resistance-area product of the detection element, the value of the resistance-area product of the detection element may be detected with the direction of magnetization of the free layer rendered parallel to the direction of magnetization of the pinned layer by applying a magnetic field to the detection element.

In the first or second method of manufacturing the magnetic head the invention, the step of fabricating the substructure may further include the step of forming a resistor element having a resistance that changes in correspondence with the resistance of the magnetoresistive film in the step of forming the medium facing surface. In the step of forming the medium facing surface, the lapping may be performed such that the resistance of the magnetoresistive film reaches the predetermined value by monitoring the resistance of the resistor element. In this case, the substrate may have a top surface, the resistor element may be disposed at a distance from the top surface of the substrate, and this distance may be equal to a distance between the magnetoresistive film and the top surface of the substrate.

The resistance of the resistor element in the step of forming the medium facing surface may have a correspondence with the distance between the surface being lapped and the boundary between the track width defining portion and the wide portion. In this case, the substrate may have a top surface, the track width defining portion may have a bottom surface closer to the top surface of the substrate and a top surface opposite to the bottom surface, and the resistor element may have a bottom surface closer to the top surface of the substrate and a top surface opposite to the bottom surface, and the distance between the bottom surface of the resistor element and the top surface of the substrate may be equal to or greater than the distance between the bottom surface of the track width defining portion and the top surface of the substrate, while the distance between the top surface of the resistor element and the top surface of the substrate may be equal to or smaller than the distance between the top surface of the track width defining portion and the top surface of the substrate.

A magnetic head substructure manufactured by a first or second method of manufacturing a magnetic head substructure of the invention is a substructure in which a plurality of pre-head portions each of which will be a magnetic head later are aligned in a plurality of rows, and the substructure is to be cut later so that the plurality of pre-head portions will be separated from one another and so that the medium facing surface will be formed by lapping a surface formed by cutting the substructure.

The first method of manufacturing the substructure of the invention includes the step of forming components of a plurality of magnetic heads on a substrate so that the pre-head portions are aligned in a plurality of rows. The step of forming the components of the plurality of magnetic heads includes the steps of forming a magnetoresistive film that will be lapped later so that a resistance thereof reaches a predetermined value and that will be thereby formed into the magnetoresistive element; detecting the resistance of the magnetoresistive film; determining a target position of a boundary between the track width defining portion and the wide portion of the pole layer based on the resistance of the magnetoresistive film detected; and forming the pole layer such that an actual position of the boundary between the track width defining portion and the wide portion coincides with the target position.

In the first method of manufacturing the substructure of the invention, in the step of detecting the resistance of the magnetoresistive film, the resistance of the magnetoresistive film may be detected while a magnetic field is applied to the magnetoresistive film.

In the first method of manufacturing the substructure of the invention, the magnetoresistive film may include: a pinned layer having a fixed direction of magnetization; a free layer having a direction of magnetization that changes in response to an external magnetic field; and a spacer layer disposed between the pinned layer and the free layer. In this case, in the step of detecting the resistance of the magnetoresistive film, the resistance of the magnetoresistive film may be detected with the direction of magnetization of the free layer rendered parallel to the direction of magnetization of the pinned layer by applying a magnetic field to the magnetoresistive film.

The second method of manufacturing the substructure of the invention includes the step of forming components of a plurality of magnetic heads on a substrate so that the pre-head portions are aligned in a plurality of rows. The step of forming the components of the plurality of magnetic heads includes the steps of forming a magnetoresistive film that will be lapped later so that a resistance thereof reaches a predetermined value and that will be thereby formed into the magnetoresistive element; detecting a value of a parameter having a correspondence with the resistance of the magnetoresistive film; determining a target position of a boundary between the track width defining portion and the wide portion of the pole layer based on the value of the parameter detected; and forming the pole layer such that an actual position of the boundary between the track width defining portion and the wide portion coincides with the target position.

In the second method of manufacturing the substructure of the invention, the step of forming the components of the plurality of magnetic heads may further include the step of forming a detection element having a resistance-area product equal to that of the magnetoresistive film, and, in the step of detecting the value of the parameter, a value of the resistance-area product of the detection element may be detected as the value of the parameter. In this case, the value of the resistance-area product of the detection element may be detected while a magnetic field is applied to the detection element.

Each of the magnetoresistive film and the detection element may include: a pinned layer having a fixed direction of magnetization; a free layer having a direction of magnetization that changes in response to an external magnetic field; and a spacer layer disposed between the pinned layer and the free layer. In this case, in the step of detecting the value of the resistance-area product of the detection element, the value of the resistance-area product of the detection element may be detected with the direction of magnetization of the free layer rendered parallel to the direction of magnetization of the pinned layer by applying a magnetic field to the detection element.

In the first or second method of manufacturing the substructure of the invention, the step of forming the components of the plurality of magnetic heads may further include the step of forming a resistor element having a resistance that changes in correspondence with the resistance of the magnetoresistive film when lapping is performed on the surface formed by cutting the substructure later. In this case, the substrate may have a top surface, the resistor element may be disposed at a distance from the top surface of the substrate, and this distance may be equal to a distance between the magnetoresistive film and the top surface of the substrate.

In the first or second method of manufacturing the substructure of the invention, the resistance of the resistor element when lapping is performed on the surface formed by cutting the substructure may have a correspondence with the distance between the surface being lapped and the boundary between the track width defining portion and the wide portion. In this case, the substrate may have a top surface, the track width defining portion may have a bottom surface closer to the top surface of the substrate and a top surface opposite to the bottom surface, and the resistor element may have a bottom surface closer to the top surface of the substrate and a top surface opposite to the bottom surface, and the distance between the bottom surface of the resistor element and the top surface of the substrate may be equal to or greater than the distance between the bottom surface of the track width defining portion and the top surface of the substrate, while the distance between the top surface of the resistor element and the top surface of the substrate may be equal to or smaller than the distance between the top surface of the track width defining portion and the top surface of the substrate.

According to the first method of manufacturing the magnetic head of the invention, in the step of fabricating the substructure, the resistance of the magnetoresistive film is detected, the target position of the boundary between the track width defining portion and the wide portion of the pole layer is determined based on the resistance of the magnetoresistive film detected, and the pole layer is formed such that the actual position of the boundary between the track width defining portion and the wide portion coincides with the target position. In the step of fabricating the magnetic heads, the lapping is performed on the surface formed by cutting the substructure, such that the magnetoresistive film is lapped and the resistance thereof thereby reaches a predetermined value, and as a result, the magnetoresistive film is formed into the magnetoresistive element. As a result, according to the invention, it is possible to reduce variations in both resistance of the magnetoresistive element and neck height of the pole layer.

According to the first method of manufacturing the substructure of the invention, the resistance of the magnetoresistive film is detected, the target position of the boundary between the track width defining portion and the wide portion of the pole layer is determined based on the resistance of the magnetoresistive film detected, and the pole layer is formed such that the actual position of the boundary between the track width defining portion and the wide portion coincides with the target position. Consequently, by manufacturing the magnetic head using this substructure, it is possible to reduce variations in both resistance of the magnetoresistive element and neck height of the pole layer.

In the first method of manufacturing the magnetic head or the first method of manufacturing the substructure of the invention, the resistance of the magnetoresistive film may be detected while a magnetic field is applied to the magnetoresistive film. In this case, the accuracy in detection of the resistance of the magnetoresistive film is enhanced, and consequently the accuracy in the target position of the boundary between the track width defining portion and the wide portion is also enhanced.

In the first method of manufacturing the magnetic head or the first method of manufacturing the substructure of the invention, in the case in which the magnetoresistive film includes the pinned layer, the free layer and the spacer layer, the resistance of the magnetoresistive film may be detected with the direction of magnetization of the free layer rendered parallel to the direction of magnetization of the pinned layer by applying a magnetic field to the magnetoresistive film. In this case, the accuracy in detection of the resistance of the magnetoresistive film is enhanced, and consequently the accuracy in the target position of the boundary between the track width defining portion and the wide portion is also enhanced.

According to the second method of manufacturing the magnetic head of the invention, in the step of fabricating the substructure, the value of the parameter having a correspondence with the resistance of the magnetoresistive film is detected, the target position of the boundary between the track width defining portion and the wide portion of the pole layer is determined based on the value of the parameter detected, and the pole layer is formed such that the actual position of the boundary between the track width defining portion and the wide portion coincides with the target position. In the step of fabricating the magnetic heads, the lapping is performed on the surface formed by cutting the substructure, such that the magnetoresistive film is lapped and the resistance thereof thereby reaches a predetermined value, and as a result, the magnetoresistive film is formed into the magnetoresistive element. As a result, according to the invention, it is possible to reduce variations in both resistance of the magnetoresistive element and neck height of the pole layer.

According to the second method of manufacturing the substructure of the invention, in the step of forming the components of the plurality of magnetic heads, the value of a parameter having a correspondence with the resistance of the magnetoresistive film is detected, the target position of the boundary between the track width defining portion and the wide portion of the pole layer is determined based on the value of the parameter detected, and the pole layer is formed such that the actual position of the boundary between the track width defining portion and the wide portion coincides with the target position. Consequently, by manufacturing the magnetic head using this substructure, it is possible to reduce variations in both resistance of the magnetoresistive element and neck height of the pole layer.

In the second method of manufacturing the magnetic head or the second method of manufacturing the substructure of the invention, the step of fabricating the substructure may further include the step of forming a detection element having a resistance-area product equal to that of the magnetoresistive film, and, in the step of detecting the value of the parameter, a value of the resistance-area product of the detection element may be detected as the value of the parameter. In this case, the value of the resistance-area product of the detection element may be detected while a magnetic field is applied to the detection element. In this case, the accuracy in detection of the resistance-area product of the detection element is enhanced, and consequently the accuracy in the target position of the boundary between the track width defining portion and the wide portion is also enhanced. In the case in which each of the magnetoresistive film and the detection element includes the pinned layer, the free layer and the spacer layer, the resistance-area product of the detection element may be detected with the direction of magnetization of the free layer rendered parallel to the direction of magnetization of the pinned layer by applying a magnetic field to the detection element. In this case, too, the accuracy in detection of the resistance-area product of the detection element is enhanced, and consequently the accuracy in the target position of the boundary between the track width defining portion and the wide portion is also enhanced.

Other and further objects, features and advantages of the invention will appear more fully from the following description.

DETAILED DESCRIPTION OF THE PREFERRED EMBODIMENTS

First Embodiment

Figure 2:
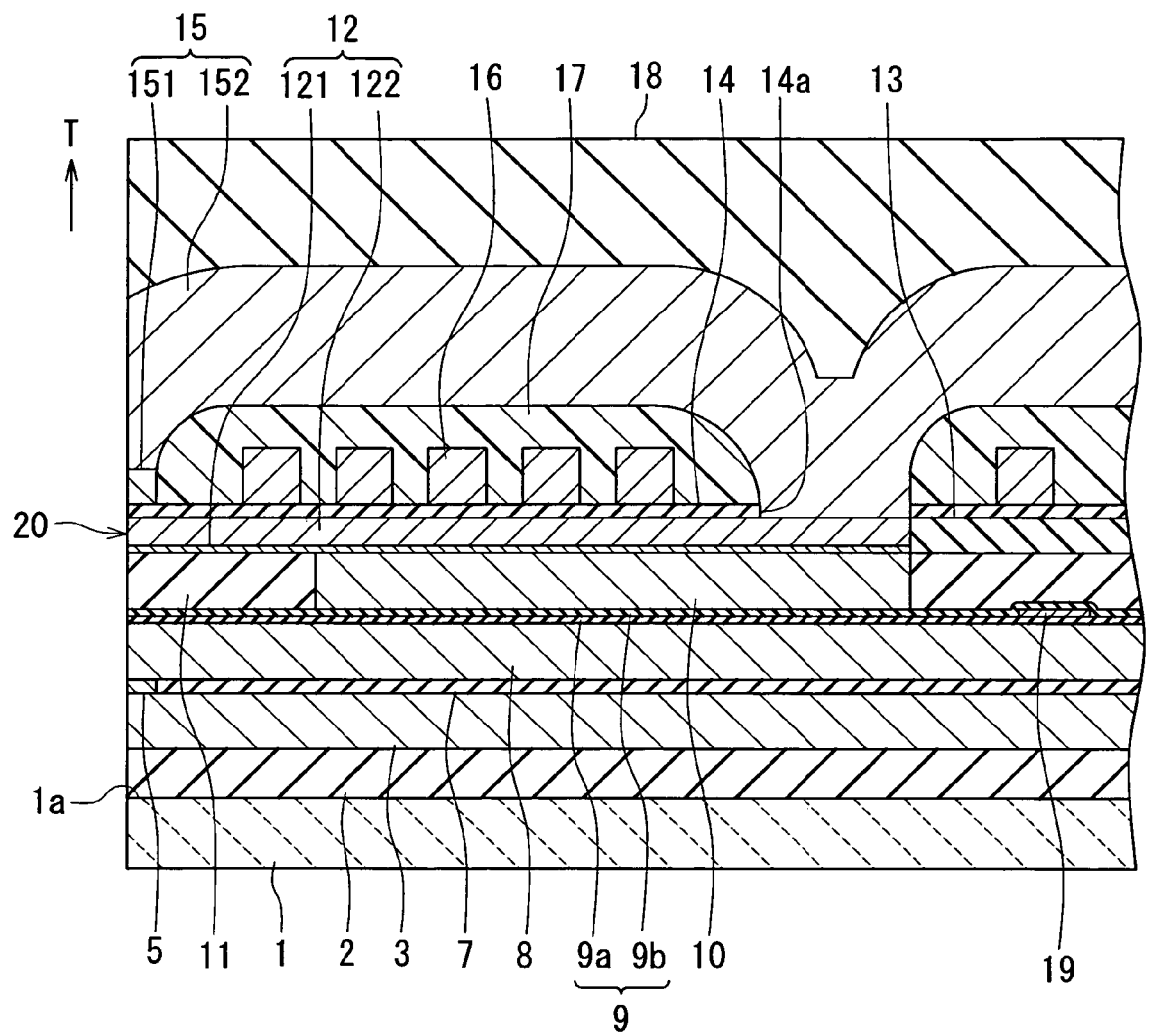
FIG. 2 is a cross-sectional view for illustrating the configuration of the magnetic head of the first embodiment of the invention.
Figure 3:
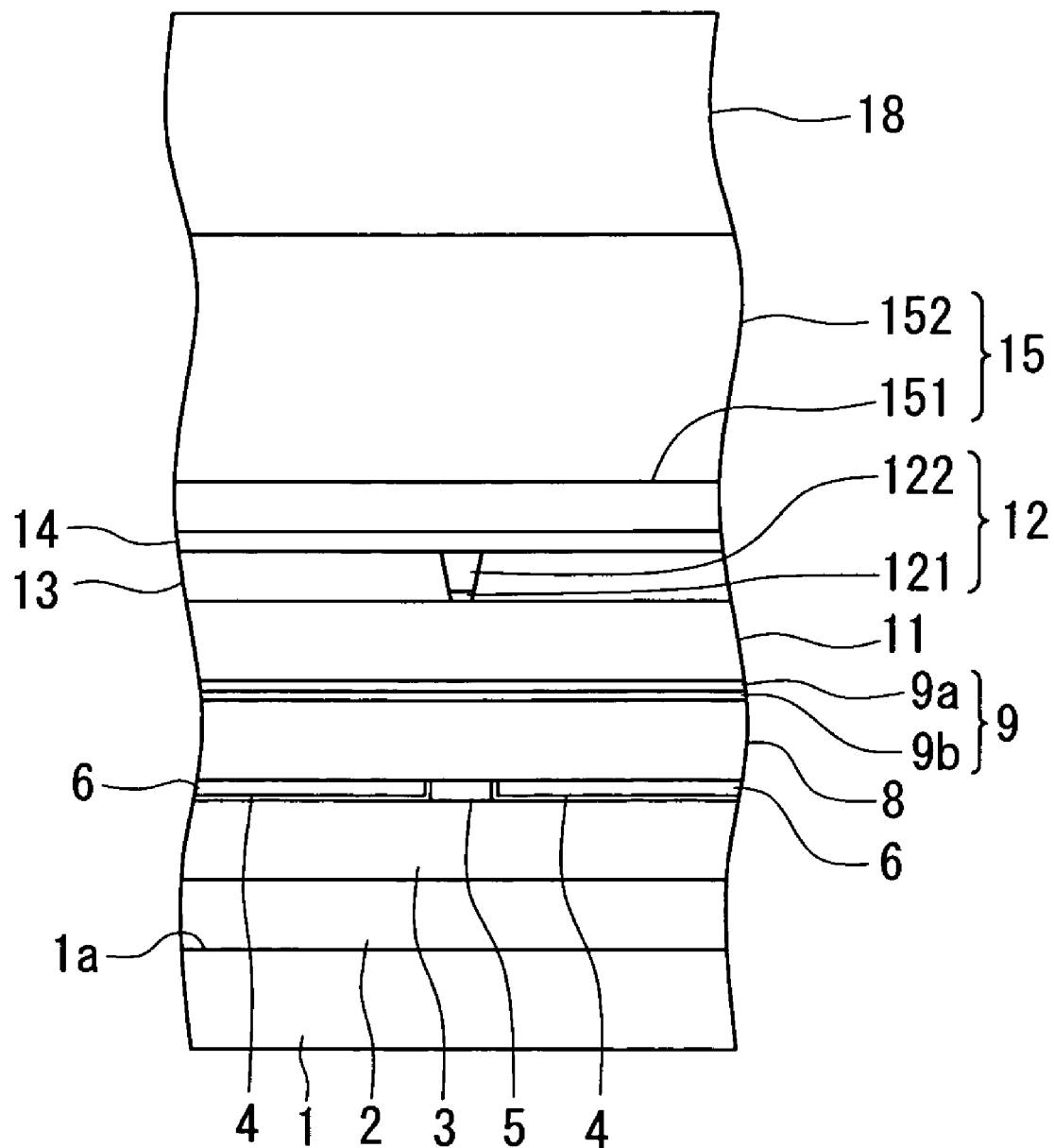
FIG. 3 is a front view of the medium facing surface of the magnetic head of the first embodiment of the invention.

Preferred embodiments of the invention will now be described in detail with reference to the accompanying drawings. Reference is now made to FIG. 2 and FIG. 3 to describe the configuration of a magnetic head manufactured through a manufacturing method of a first embodiment of the invention. Here is given an example of a magnetic head for the perpendicular magnetic recording system wherein a TMR element is employed as the MR element. FIG. 2 is a cross-sectional view for illustrating the configuration of the magnetic head. FIG. 3 is a front view of the medium facing surface of the magnetic head. FIG. 2 illustrates a cross section perpendicular to the medium facing surface and the top surface of a substrate. The arrow indicated with T in FIG. 2 shows the direction of travel of a recording medium.

As shown in FIG. 2, the magnetic head of the embodiment has a medium facing surface 20 that faces toward a recording medium. As shown in FIG. 2 and FIG. 3, the magnetic head incorporates: a substrate 1 made of a ceramic such as aluminum oxide and titanium carbide ($Al_2O_3$—TiC) and having a top surface 1a; an insulating layer 2 made of an insulating material such as alumina ($Al_2O_3$) and disposed on the substrate 1; a first read shield layer 3 made of a magnetic material and disposed on the insulating layer 2; an MR element 5 disposed on the first read shield layer 3; two bias field applying layers 6 disposed adjacent to the two sides of the MR element 5; an insulating layer 4 disposed between the bias field applying layers 6 and each of the first read shield layer 3 and the MR element 5; and an insulating layer 7 disposed around the MR element 5 and the bias field applying layers 6. The MR element 5 has an end located in the medium facing surface 20. The insulating layer 7 is made of an insulating material such as alumina. The magnetic head further incorporates: a second read shield layer 8 made of a magnetic material and disposed on the MR element 5, the bias field applying layers 6 and the insulating layer 7; and a separating layer 9 made of a nonmagnetic material such as alumina and disposed on the second read shield layer 8. The portion from the first read shield layer 3 to the second read shield layer 8 makes up a read head.

The MR element 5 is a TMR element. A sense current for detecting magnetic signals is fed to the MR element 5 in a direction intersecting the plane of each layer making up the MR element 5, such as the direction perpendicular to the plane of each layer making up the MR element 5.

The magnetic head further incorporates: a yoke layer 10 made of a magnetic material and disposed on the separating layer 9; and an insulating layer 11 made of an insulating material such as alumina and disposed around the yoke layer 10 on the separating layer 9. An end of the yoke layer 10 closer to the medium facing surface 20 is located at a distance from the medium facing surface 20. The yoke layer 10 and the insulating layer 11 have flattened top surfaces.

The magnetic head further incorporates: a pole layer 12 made of a magnetic material and disposed on the yoke layer 10 and the insulating layer 11; and an insulating layer 13 made of an insulating material such as alumina and disposed around the pole layer 12 on the yoke layer 10 and the insulating layer 11. The pole layer 12 and the insulating layer 13 have flattened top surfaces. The pole layer 12 has an end face located in the medium facing surface 20. The pole layer 12 is connected to the yoke layer 10. The pole layer 12 may be formed of a single layer or may be formed of a plurality of layers stacked. Here, by way of example, the pole layer 12 is formed of a first layer 121 disposed on the yoke layer 10 and the insulating layer 11, and a second layer 122 disposed on the first layer 121.

FIG. 2 illustrates an example in which the yoke layer 10 is located below the pole layer 12, that is, located backward of the pole layer 12 in the direction T of travel of the recording medium (located closer to the air-inflow end of the slider). However, the yoke layer 10 may be located above the pole layer 12, that is, located forward of the pole layer 12 in the direction T of travel of the recording medium (located closer to the air-outflow end of the slider).

The magnetic head further incorporates: a gap layer 14 made of an insulating material such as alumina and disposed on the pole layer 12 and the insulating layer 13; a coil 16 formed on the gap layer 14; and an insulating layer 17 disposed to cover the coil 16. The coil 16 is flat-whorl-shaped. The gap layer 14 has an opening 14a formed in a region corresponding to the center of the coil 16. The insulating layer 17 is made of photoresist, for example. An end of the insulating layer 17 closer to the medium facing surface 20 is located at a distance from the medium facing surface 20.

The magnetic head further incorporates a write shield layer 15 made of a magnetic material. The write shield layer 15 has: a first layer 151 disposed on the gap layer 14 in a region between the medium facing surface 20 and the end of the insulating layer 17 closer to the medium facing surface 20; and a second layer 152 disposed on the first layer 151 and the insulating layer 17. The second layer 152 is connected to the pole layer 12 through the opening 14a. Each of the first layer 151 and the second layer 152 has an end face located in the medium facing surface 20.

The magnetic head further incorporates an overcoat layer 18 made of an insulating material such as alumina and disposed to cover the write shield layer 15. The portion from the yoke layer 10 to the write shield layer 15 makes up a write head.

In the embodiment the separating layer 9 is formed of an insulating film 9a disposed on the second read shield layer 8 and an insulating film 9b disposed on the insulating film 9a. The magnetic head further incorporates a heater 19 disposed between the insulating films 9a and 9b. Two leads not shown are connected to the heater 19. The heater 19 is provided for heating the components of the write head including the pole layer 12 to control the distance between the recording medium and the end face of the pole layer 12 located in the medium facing surface 20. The heater 19 is energized through the two leads and is thereby made to produce heat, and heats the components of the write head. As a result, the components of the write head expand and the end face of the pole layer 12 located in the medium facing surface 20 thereby gets closer to the recording medium.

As described so far, the magnetic head has the medium facing surface 20 that faces toward the recording medium, the read head, and the write head. The read head and the write head are stacked on the substrate 1. The read head is located backward in the direction T of travel of the recording medium (that is, located closer to the air-inflow end of the slider), while the write head is located forward in the direction T of travel of the recording medium (that is, located closer to the air-outflow end of the slider). The magnetic head writes data on the recording medium through the use of the write head, and reads data stored on the recording medium through the use of the read head.

The read head incorporates the MR element 5, and the first read shield layer 3 and the second read shield layer 8 that are disposed to sandwich the MR element 5 therebetween. FIG. 2 and FIG. 3 illustrate an example in which the MR element 5 is a TMR element. The first read shield layer 3 and the second read shield layer 8 also function as a pair of electrodes for feeding a sense current to the MR element 5 in a direction intersecting the plane of each layer making up the MR element 5, such as the direction perpendicular to the plane of each layer making up the MR element 5. In addition to the first read shield layer 3 and the second read shield layer 8, a pair of electrodes may be respectively provided on top and bottom of the MR element 5. The MR element 5 has a resistance that changes in response to an external magnetic field, that is, a signal magnetic field sent from the recording medium. It is possible to determine the resistance of the MR element 5 from the sense current. In the manner thus described, it is possible to read data stored on the recording medium through the use of the read head.

The MR element 5 is not limited to the TMR element but may be an MR element of any other type, such as a GMR element having the CIP structure or a GMR element having the CPP structure. In the case in which the MR element 5 is a GMR element having the CIP structure, a pair of electrodes for feeding a sense current to the MR element 5 are respectively provided on both sides of the MR element 5 taken in the width direction, and shield gap films made of an insulating material are respectively provided between the MR element 5 and the first read shield layer 3 and between the MR element 5 and the second read shield layer 8.

In place of the second read shield layer 8, there may be provided a layered film made up of two magnetic layers and a nonmagnetic layer disposed between the two magnetic layers. The nonmagnetic layer is made of a nonmagnetic material such as ruthenium (Ru) or alumina.

The write head incorporates the yoke layer 10, the pole layer 12, the coil 16 and the write shield layer 15. The coil 16 generates a magnetic field that corresponds to data to be written on the recording medium. The pole layer 12 has an end face located in the medium facing surface 20, and allows a magnetic flux corresponding to the magnetic field generated by the coil 16 to pass and generates a write magnetic field used for writing the data on the recording medium by means of the perpendicular magnetic recording system. The write shield layer 15 has an end face located in the medium facing surface 20 and has a portion located away from the medium facing surface 20 and coupled to the pole layer 12. The pole layer 12 and the write shield layer 15 form a magnetic path through which the magnetic flux corresponding to the magnetic field generated by the coil 16 passes. In the medium facing surface 20 the end face of the write shield layer 15 is located forward of the end face of the pole layer 12 in the direction T of travel of the recording medium (that is, located closer to the air-outflow end of the slider) with a specific small space created by the gap layer 14. The position of the end of a bit pattern to be written on the recording medium is determined by the position of an end of the pole layer 12 that is closer to the gap layer 14 and located in the medium facing surface 20. The shield layer 15 takes in a magnetic flux that is generated from the end face of the pole layer 12 closer to the medium facing surface 20 and that expands in directions except the direction orthogonal to the surface of the recording medium, and thereby prevents this flux from reaching the recording medium. It is thereby possible to prevent the direction of magnetization in the bit pattern already written on the recording medium from changing due to the influence of the above-mentioned flux. It is thereby possible to improve linear recording density. Furthermore, the write shield layer 15 takes in a disturbance magnetic field applied from outside the magnetic head to the magnetic head. It is thereby possible to prevent erroneous writing on the recording medium caused by the disturbance magnetic field intensively taken into the pole layer 12. The write shield layer 15 also has a function of returning a magnetic flux that has been generated from the end face of the pole layer 12 and has magnetized the recording medium.

Figure 1:
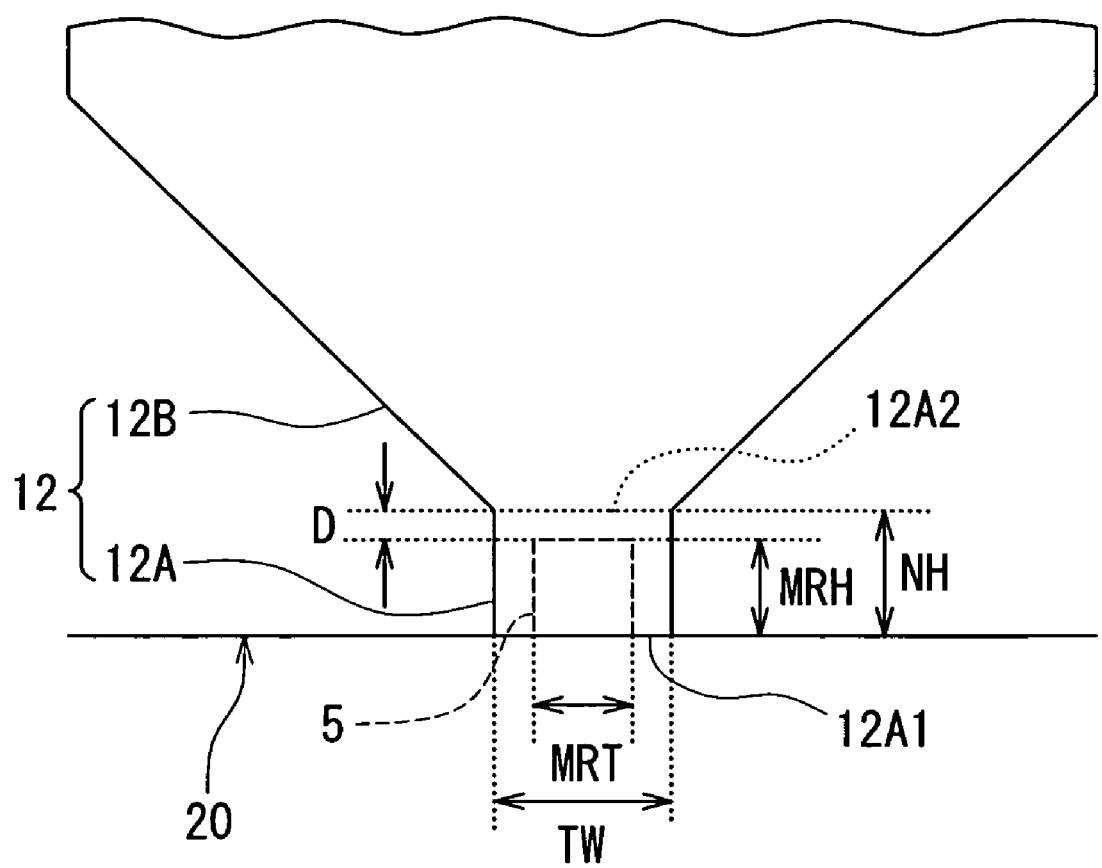
FIG. 1 illustrates a portion of a pole layer of a magnetic head of a first embodiment of the invention in a neighborhood of a medium facing surface.

Reference is now made to FIG. 1 to describe details of the shape of the pole layer 12 and the positional relationship between the MR element 5 and the pole layer 12. FIG. 1 is a top view of a portion of the pole layer 12 near the medium facing surface 20. The pole layer 12 includes a track width defining portion 12A and a wide portion 12B. The track width defining portion 12A includes a first end 12A1 located in the medium facing surface 20 and a second end 12A2 located away from the medium facing surface 20, and has a width that defines track width TW. The wide portion 12B is coupled to the second end 12A2 of the track width defining portion 12A and has a width greater than the width of the track width defining portion 12A. The width of the track width defining portion 12A is nearly uniform. The wide portion 12B is, for example, equal in width to the track width defining portion 12A at the boundary with the track width defining portion 12A, and gradually increases in width as the distance from the medium facing surface 20 increases and then maintains a specific width to the end of the wide portion 12B. Here, the distance from the medium facing surface 20 to the boundary between the track width defining portion 12A and the wide portion 12B, that is, the length of the track width defining portion 12A taken in the direction orthogonal to the medium facing surface 20, is called a neck height and indicated with NH.

The MR element 5 is located below the track width defining portion 12A, that is, located closer to the substrate 1 than the track width defining portion 12A. The length of the MR element 5 taken in the direction orthogonal to the medium facing surface 20 is called an MR height and indicated with MRH. The difference between neck height NH and MR height MRH 'NH−MRH' is indicated with D. FIG. 1 illustrates an example in which the neck height NH is greater than the MR height MRH. In this case, the difference D is of a positive value. In the case in which the neck height NH is smaller than the MR height MRH, the difference D is of a negative value. The width (the length in the direction of track width) of the MR element 5 is indicated with MRT.

Figure 4:
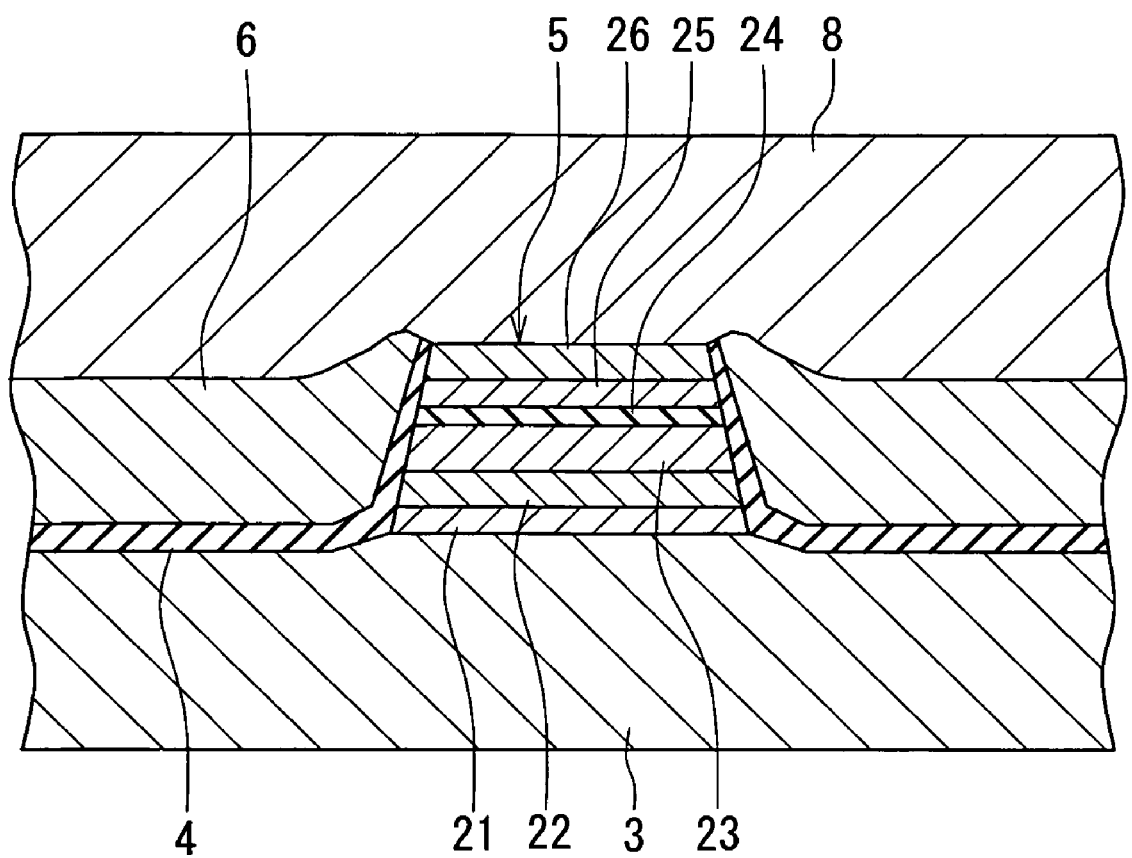
FIG. 4 is a cross-sectional view for illustrating an example of the configuration of an MR element of the first embodiment of the invention.

Reference is now made to FIG. 4 to describe an example of configuration of the MR element 5. FIG. 4 is a cross-sectional view for illustrating a cross section of the MR element 5 parallel to the medium facing surface 20. The MR element 5 of FIG. 4 incorporates: a pinned layer 23 that is a ferromagnetic layer having a fixed direction of magnetization; a free layer 25 that is a ferromagnetic layer having a direction of magnetization that changes in response to an external magnetic field; and a spacer layer 24 disposed between the pinned layer 23 and the free layer 25. In the example shown in FIG. 4, the pinned layer 23 is located closer to the first read shield layer 3 than the free layer 25. The MR element 5 of FIG. 4 further incorporates: an antiferromagnetic layer 22 disposed on a side of the pinned layer 23 farther from the spacer layer 24; an underlying layer 21 disposed between the first read shield layer 3 and the antiferromagnetic layer 22; and a protection layer 26 disposed between the free layer 25 and the second read shield layer 8. In the MR element 5 of FIG. 4, on the first read shield layer 3, there are stacked the underlying layer 21, the antiferromagnetic layer 22, the pinned layer 23, the spacer layer 24, the free layer 25 and the protection layer 26 in this order. The insulating layer 4 is provided between the bias field applying layers 6 and each of the first read shield layer 3 and the MR element 5.

The antiferromagnetic layer 22 is a layer that fixes the direction of magnetization of the pinned layer 23 by exchange coupling with the pinned layer 23. The underlying layer 21 is provided for improving the crystallinity and orientability of each layer formed thereon and particularly for enhancing the exchange coupling between the antiferromagnetic layer 22 and the pinned layer 23. The protection layer 26 is a layer for protecting the layers therebelow. In the pinned layer 23 the direction of magnetization is fixed by exchange coupling with the antiferromagnetic layer 22 at the interface with the antiferromagnetic layer 22.

In the case in which the MR element 5 is a TMR element, the spacer layer 24 is a tunnel barrier layer that allows electrons to pass therethrough while the electrons maintain spins by means of the tunnel effect. In the case in which the MR element 5 is a GMR element having the CPP structure, the spacer layer 24 is a nonmagnetic conductive layer.

In the example shown in FIG. 4, the two side surfaces of the MR element 5 are not perpendicular to the top surface of the substrate 1, and the width of the MR element 5 decreases toward the top thereof. In the embodiment, in such a case, the width MRT of the MR element 5 is defined as follows. In the case in which the MR element 5 is a TMR element, the width of the spacer layer 24 that is a tunnel barrier layer is defined as the width MRT of the MR element 5. In the case in which the MR element 5 is a GMR element having the CPP structure or a GMR element having the CIP structure, the distance between the two side surfaces of the free layer 25 taken in the direction of track width is defined as the width MRT of the MR element 5 by way of example.

A method of manufacturing the magnetic head of the embodiment will now be described. The method of the embodiment includes the step of fabricating a magnetic head substructure in which a plurality of pre-head portions each of which will be the magnetic head later are aligned in a plurality of rows by forming components of a plurality of magnetic heads on a single substrate, and the step of fabricating the plurality of magnetic heads by separating the plurality of pre-head portions from one another by cutting the magnetic head substructure.

A method of manufacturing a magnetic head substructure of the embodiment includes the step of forming components of a plurality of magnetic heads on a single substrate so that a plurality of pre-head portions are aligned in a plurality of rows. The step of forming the components of the plurality of magnetic heads is the same as the step of fabricating the magnetic head substructure in the foregoing method of manufacturing the magnetic head.

Figure 5:
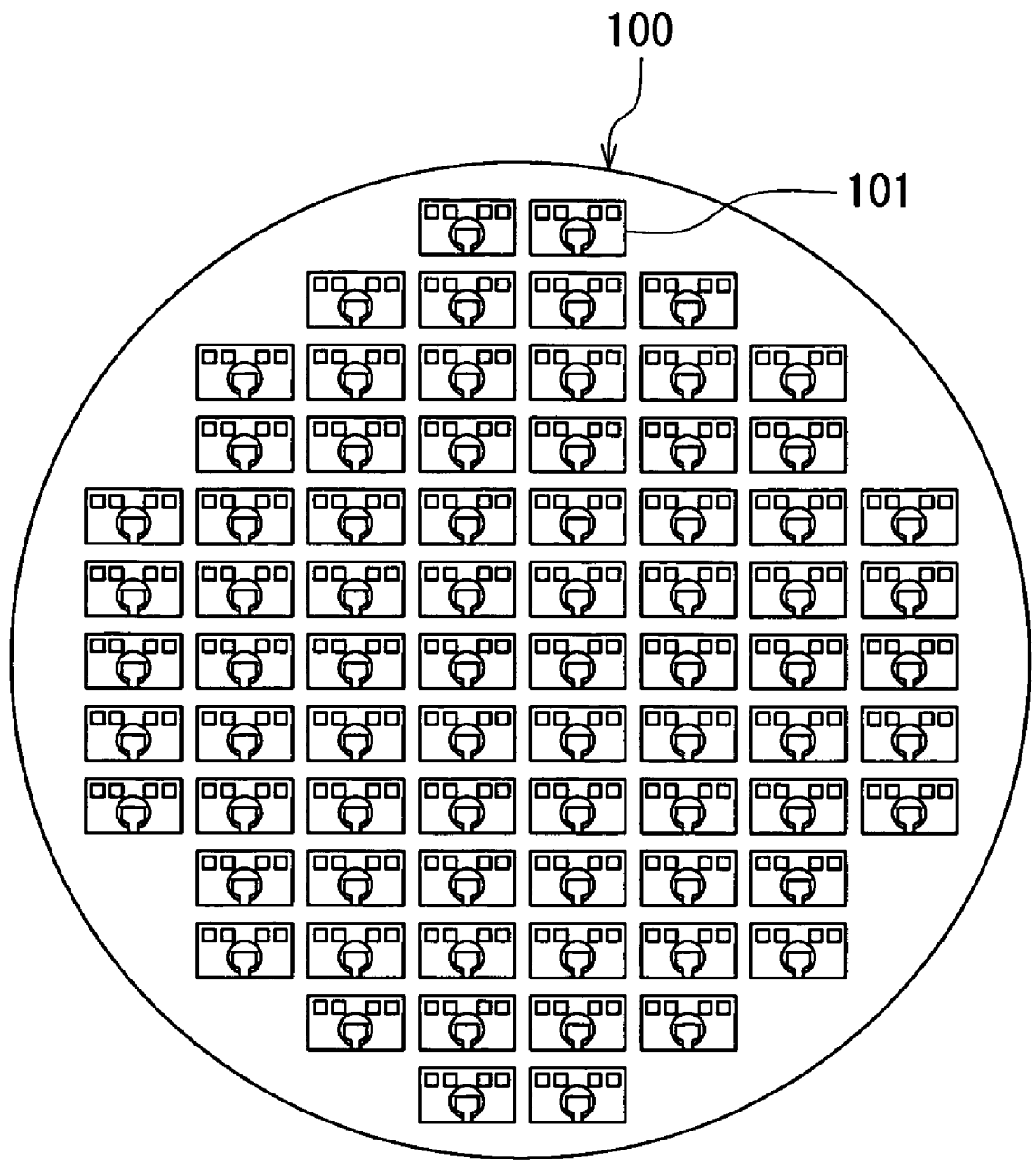
FIG. 5 is a top view of a magnetic head substructure of the first embodiment of the invention.
Figure 6:
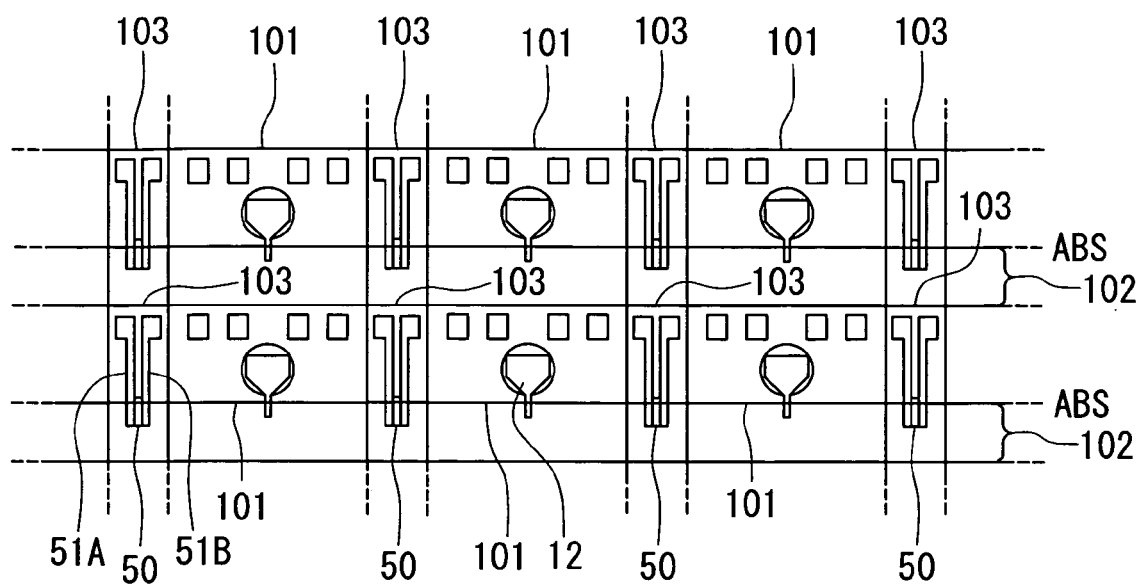
FIG. 6 is a view for illustrating part of the magnetic head substructure of the first embodiment of the invention.

FIG. 5 is a top view of the magnetic head substructure. FIG. 6 is a view for illustrating part of the magnetic head substructure. As shown in FIG. 5 and FIG. 6, the magnetic head substructure (hereinafter simply called the substructure) 100 incorporates pre-head portions 101 aligned in a plurality of rows. In FIG. 6 'ABS' indicates an imaginary plane located at the target position of the medium facing surface 20. In the embodiment a group of pre-head portions 101 aligned in the direction parallel to the plane ABS, that is, the horizontal direction in FIG. 6, is called a row.

The substructure 100 further incorporates: inter-row portions to be removed 102 each of which is located between adjacent two rows; and intra-row portions to be removed 103 each of which is located between two of the pre-head portions 101 adjacent to each other in each row. Neither of the portions 102 and 103 will remain in the magnetic heads.

The substructure 100 further incorporates a plurality of resistor lapping guides (hereinafter referred to as RLG) 50 each of which is disposed to extend across a different one of the intra-row portions to be removed 103 and part of one of the inter-row portions to be removed 102 adjacent thereto. Each RLG 50 is a resistor film having a predetermined shape. Each RLG 50 corresponds to the resistor element of the invention. Two leads 51A and 51B are connected to each RLG 50 and it is thereby possible to energize the RLG 50 through the two leads 51A and 51B. The function of the RLGs 50 will be described in detail later.

Figure 7:
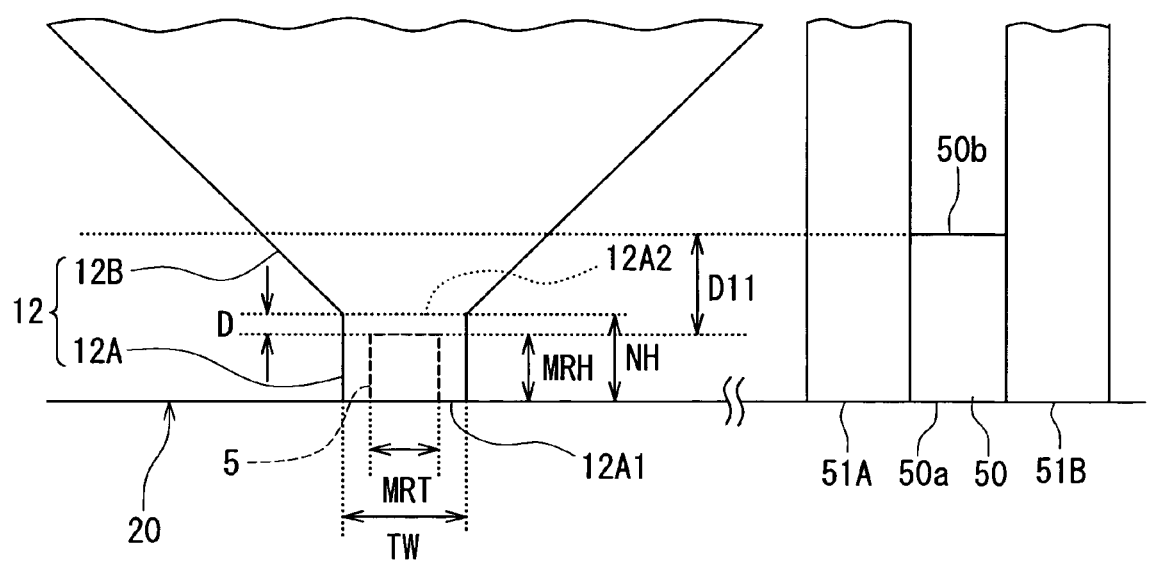
FIG. 7 is a view for illustrating the positional relationship among the MR element, the pole layer and RLG of the first embodiment of the invention.
Figure 8:
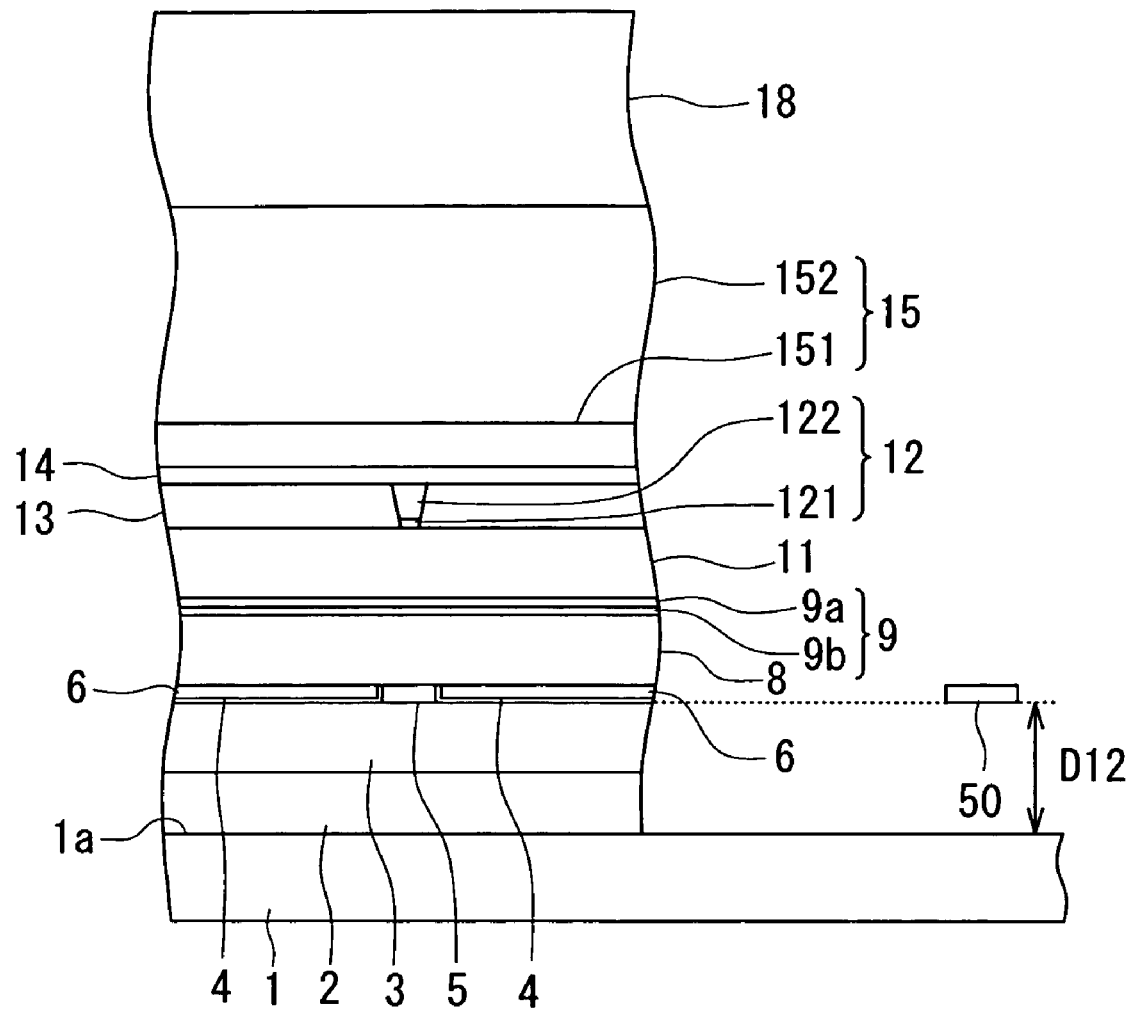
FIG. 8 is a view for illustrating the positional relationship among the MR element, the pole layer and RLG of the first embodiment of the invention.

The positional relationship among the MR element 5, the pole layer 12 and the RLG 50 will now be described with reference to FIG. 7 and FIG. 8. FIG. 7 and FIG. 8 each illustrate the positional relationship among the MR element 5, the pole layer 12 and the RLG 50 when the medium facing surface 20 has been formed. FIG. 7 illustrates the MR element 5, the pole layer 12 and the RLG 50 as seen in the direction orthogonal to the top surface 1a of the substrate 1. FIG. 8 illustrates the MR element 5, the pole layer 12 and the RLG 50 as seen in the direction orthogonal to the medium facing surface 20.

As shown in FIG. 7, when the medium facing surface 20 has been formed, the RLG 50 has a first end 50a located in the medium facing surface 20 and a second end 50b opposite thereto. There is a difference D11 of a specific value between the distance from the medium facing surface 20 to the second end 50b of the RLG 50 and the distance from the medium facing surface 20 to an end of the MR element 5 farther from the medium facing surface 20. The difference D11 may be zero.

As shown in FIG. 8, the RLG 50 is disposed at a distance from the top surface 1a of the substrate 1. The distance D12 between the RLG 50 and the top surface 1a of the substrate 1 is equal to the distance between the MR element 5 and the top surface 1a of the substrate 1, for example.

Figure 9:
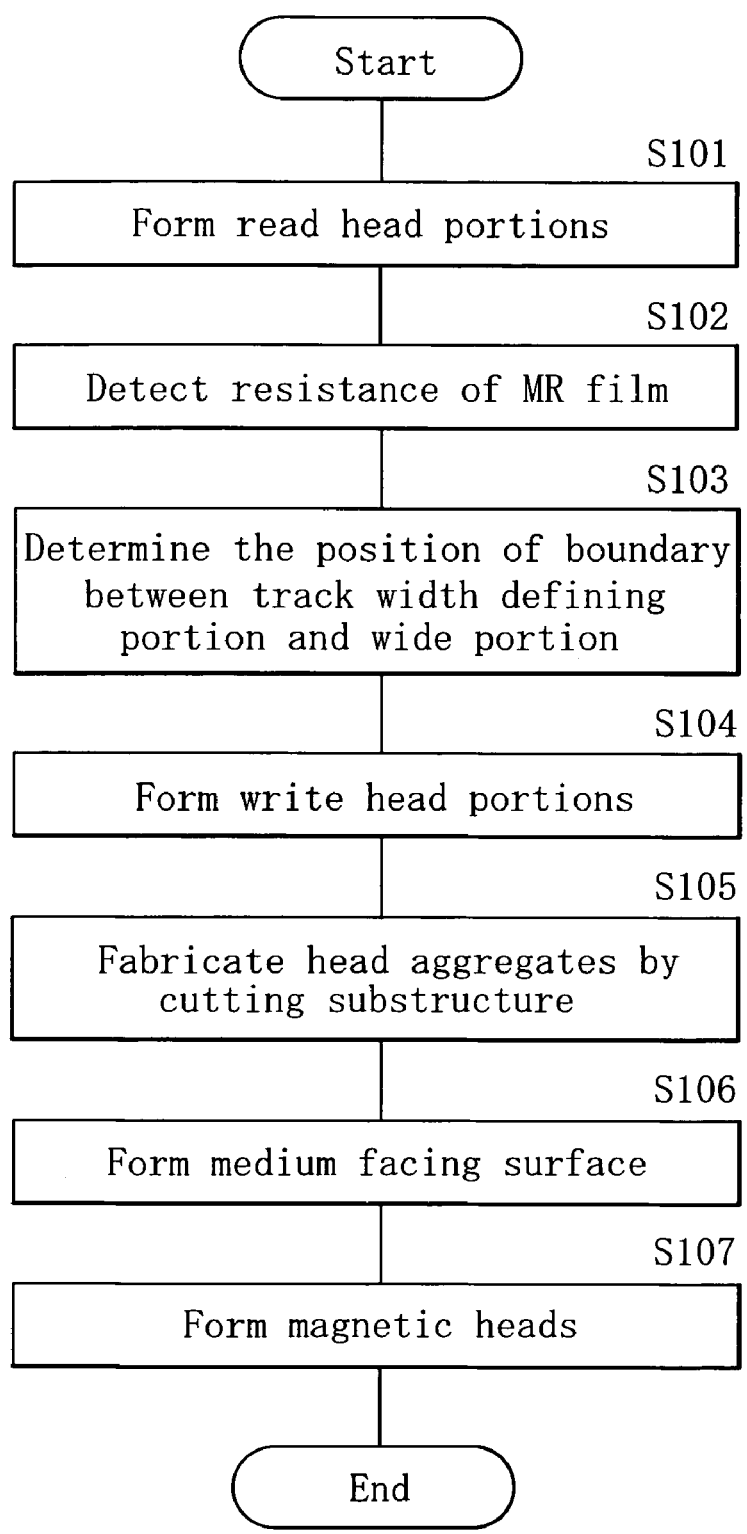
FIG. 9 is a flow chart for showing the outline of a method of manufacturing the magnetic head of the first embodiment of the invention.

Reference is now made to FIG. 9 to describe the outline of the method of manufacturing the magnetic head of the embodiment. In FIG. 9, Steps S101 to S104 are included in the step of fabricating the substructure 100, and Steps S105 to S107 are included in the step of fabricating the magnetic heads.

In the step of fabricating the substructure 100, first, a plurality of read head portions each of which will be the read head later are formed on a single substrate (Step S101). Each of the read head portions includes a magnetoresistive film (hereinafter referred to as an MR film) that will be formed into the MR element 5 by undergoing lapping later. Therefore, the step of forming the read head portions (Step S101) includes the step of forming the MR films. In the step of forming the read head portions, the RLGs 50 are also formed.

Next, the resistance of the MR film is detected (Step S102). Next, based on the resistance of the MR film detected in Step S102, the target position of the boundary between the track width defining portion 12A and the wide portion 12B of the pole layer 12 is detected (Step S103).

Next, a plurality of write head portions each of which will be the write head later are formed (Step S104). Each of the write head portions includes the pole layer 12. Therefore, the step of forming the write head portions (Step S104) includes the step of forming the pole layers 12. In the step of forming the pole layers 12, each of the pole layers 12 is formed such that the actual position of the boundary between the track width defining portion 12A and the wide portion 12B coincides with the target position determined in Step S103.

The substructure 100 is thus fabricated through the foregoing steps. Next, in the step of fabricating the magnetic heads, first, the substructure 100 is cut at positions within the inter-row portions to be removed 102 shown in FIG. 6 to thereby fabricate a plurality of head aggregates each of which includes a plurality of pre-head portions 101 aligned in a row (Step S105).

Next, lapping is performed on a surface (the surface closer to the plane ABS) formed in each of the head aggregates by cutting the substructure 100, whereby the medium facing surface 20 is formed for each of the plurality of pre-head portions 101 included in each of the head aggregates (Step S106). In this step of forming the medium facing surface 20 (Step S106), the lapping is performed such that the MR film is lapped so that the resistance thereof reaches a predetermined value and the MR film is thereby formed into the MR element 5.

Next, each head aggregate is cut so that the plurality of pre-head portions 101 are separated from one another, whereby a plurality of magnetic heads are formed (Step S107).

Figure 10:
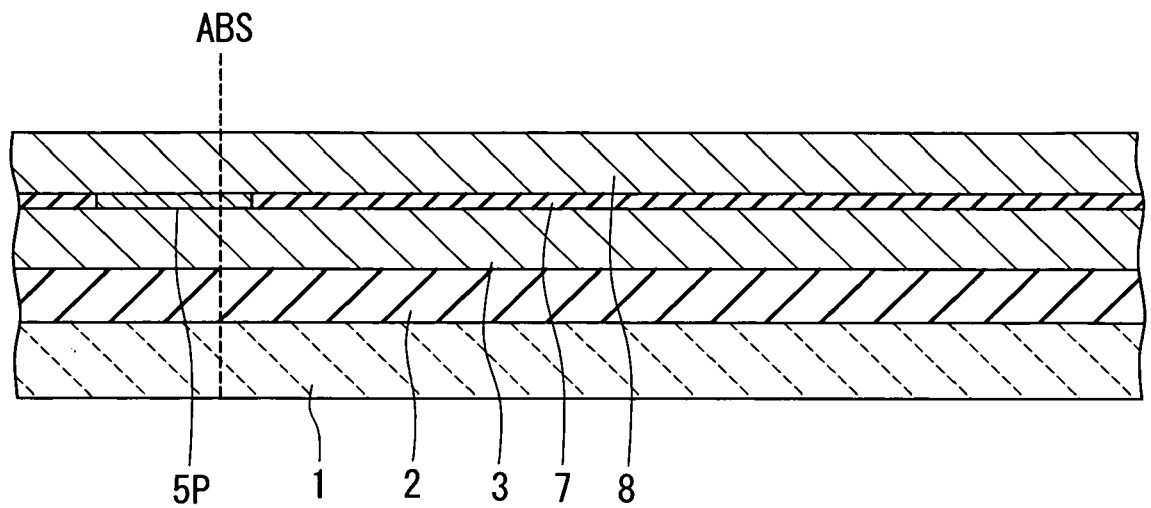
FIG. 10 is a cross-sectional view of a layered structure obtained in the course of a process of fabricating the substructure of the first embodiment of the invention.

Reference is now made to FIG. 10 to FIG. 15 to describe the step of fabricating the substructure 100 (Steps S101 to S104) in detail. Reference is first made to FIG. 10 to describe Step S101 of FIG. 9. FIG. 10 illustrates a cross section of a layered structure obtained in the course of the process of fabricating the substructure 100, the cross section being perpendicular to the plane ABS and the top surface 1a of the substrate 1. In Step S101, first, the insulating layer 2 is formed on the substrate 1. Next, the first read shield layer 3 is formed on the insulating layer 2. The first read shield layer 3 is formed into a predetermined pattern, and an insulating layer (not shown) is formed around the first read shield layer 3. Then, the top surfaces of this insulating layer and the first read shield layer 3 are flattened. Next, the MR film 5P, the two bias field applying layers 6 and the insulating layer 7 are formed on the first read shield layer 3. Next, the second read shield layer 8 is formed on the MR film 5P, the bias field applying layers 6 and the insulating layer 7. The MR film 5P has a film configuration the same as that of the MR element 5 to be formed, and the configuration may be one shown in FIG. 4, for example.

Figure 11:
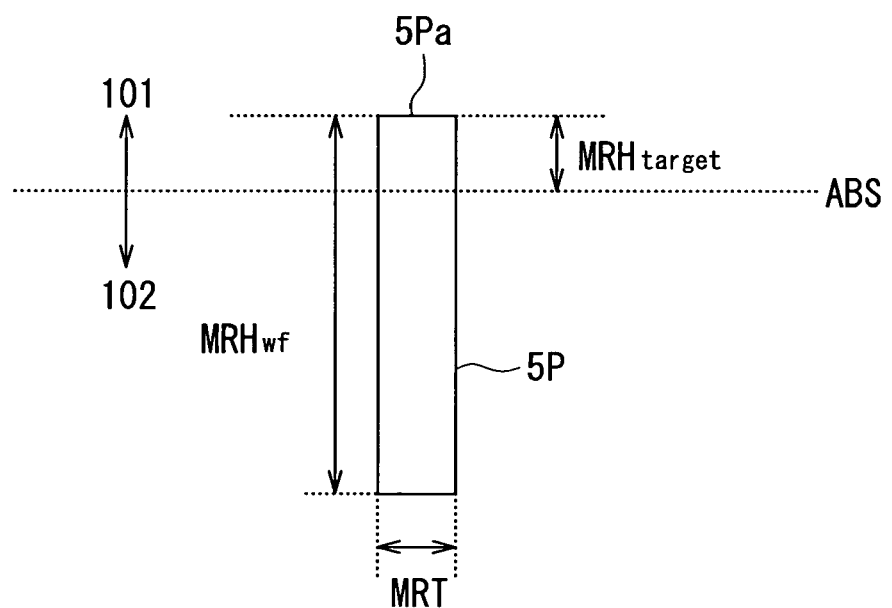
FIG. 11 is a top view of an MR film of the first embodiment of the invention.

FIG. 11 is a top view of the MR film 5P. The top surface of the MR film 5P is rectangular in shape. The MR film 5P is disposed to extend across the pre-head portion 101 and part of the intra-row portion to be removed 102 that are adjacent to each other with the plane ABS located in between. Here, the length of the MR film 5P as initially formed taken in the direction orthogonal to the medium facing surface 20 (the vertical direction in FIG. 11) is indicated with $MRH_{wf}$. The width of the MR film 5P is equal to the width MRT of the MR element 5 to be formed. Of the two ends of the MR film 5P opposed to each other in the direction orthogonal to the medium facing surface 20, the end 5Pa located in the pre-head portion 101 will be an end of the MR element 5 farther from the medium facing surface 20 later.

The RLG 50 is also formed in Step S101. A method of forming the RLG 50 will now be described. In this method, first, before the MR film 5P is formed, a film to become the RLG 50 later is formed by sputtering, for example, on the insulating layer formed around the first read shield layer 3. Next, an etching mask is formed on this film. Next, a portion of the film to become the RLG 50 not covered with the etching mask is selectively etched by dry etching. Next, the etching mask is removed. As a result, the remaining portion of the film becomes the RLG 50. Materials employable to form the RLG 50 include NiFe, Ru, and Au. The shape and location of the RLG 50 are predetermined so that the resistance of the RLG 50 changes in correspondence with the resistance of the MR film 5P in the step of forming the medium facing surface 20 (Step S106).

The end 5Pa of the MR film 5P is formed by etching a film to become the MR film 5P using an etching mask. The etching step for forming the end 5Pa and the etching step for forming the RLG 50 are preferably performed at the same time. In this case, the etching mask to be used for forming the end 5Pa and the etching mask to be used for forming the RLG 50 are preferably formed in the same photolithography step.

In the embodiment, after the second read shield layer 8 is formed, the resistance of the MR film 5P is detected (Step S102) at some stage before the pole layer 12 is formed. The resistance of the MR film 5P is indicated with $MRR_{wf}$. It is possible to detect the resistance $MRR_{wf}$ of the MR film 5P by feeding a current to the MR film 5P through the use of the first read shield layer 3 and the second read shield layer 8. Here, the resistance of one of the MR films 5P may be detected and the value thus obtained may be defined as the resistance $MRR_{wf}$. Alternatively, the resistances of a plurality of MR films 5P may be detected and the mean value thereof may be defined as the resistance $MRR_{wf}$.

In the embodiment, based on the resistance $MRR_{wf}$, the target value $MRH_{target}$ of the MR height is determined in the following manner so that the resistances of the MR elements 5 are uniform. Here, the target value of the resistance of the MR element 5 is indicated with $MRR_{target}$. The target value $MRH_{target}$ of the MR height is obtained from Equation (1) below.

$$MRH_{target} = MRH_{wf} \times MRR_{wf}/MRR_{target} \quad (1)$$

Even in the case in which variations occur in the resistance $MRR_{wf}$ because of variations in resistance-area product and the width MRT of the MR films 5P, if the MR elements 5 are formed such that the actual MR height MRH is equal to the target value $MRH_{target}$, it is possible to make the resistances of the MR elements 5 be of a uniform value equal to the target value $MRR_{target}$. As thus described, in the embodiment, although the MR height MRH changes with the resistance $MRR_{wf}$, it is possible to make the resistances of the MR elements 5 be of a uniform value.

Once the target value $MRH_{target}$ of the MR height is determined as described above, the target position of the medium facing surface 20 (the position of the plane ABS) is also determined. Furthermore, in the embodiment, the target position of the boundary between the track width defining portion 12A and the wide portion 12B of the pole layer 12 to be formed later is determined (Step S103) based on the resistance $MRR_{wf}$. This target position of the boundary between the track width defining portion 12A and the wide portion 12B is determined in the following manner so that the neck height NH is uniform. Here, the target value of the neck height NH is indicated with $NH_{target}$. In the embodiment, the difference D between the neck height NH and the MR height MRH shown in FIG. 1 is obtained from Equation (2) below.

$$D = NH_{target} - MRH_{target} \quad (2)$$
$$= NH_{target} - MRH_{wf} \times MRR_{wf}/MRR_{target}$$

The target position of the boundary between the track width defining portion 12A and the wide portion 12B is the position away from the end 5Pa of the MR film 5P by the difference D along the direction orthogonal to the plane ABS. If the difference D is of a positive value, the target position of the boundary between the track width defining portion 12A and the wide portion 12B is the position farther from the plane ABS than the end 5Pa of the MR film 5P. If the difference D is of a negative value, the target position of the boundary between the track width defining portion 12A and the wide portion 12B is the position closer to the plane ABS than the end 5Pa of the MR film 5P. It can also be said that the target position of the boundary between the track width defining portion 12A and the wide portion 12B is the position away from the target position of the medium facing surface 20 (the position of the plane ABS) determined as previously described, by a distance equal to the target value $NH_{target}$ of the neck height NH.

In Step S102, it is preferred that the resistance of the MR film 5P be detected while a magnetic field is applied to the MR film 5P. In particular, in the case in which the MR film 5P includes the pinned layer 23, the free layer 25 and the spacer layer 24 as shown in FIG. 4, for example, in Step S102 it is preferred that the resistance of the MR film 5P be detected with the direction of magnetization of the free layer 25 rendered parallel to the direction of magnetization of the pinned layer 23 by applying a magnetic field to the MR film 5P. By detecting the resistance of the MR film 5P in this manner, the accuracy in detection of the resistance of the MR film 5P is enhanced, and consequently the accuracy in the target position of the boundary between the track width defining portion 12A and the wide portion 12B is also enhanced.

Figure 12:
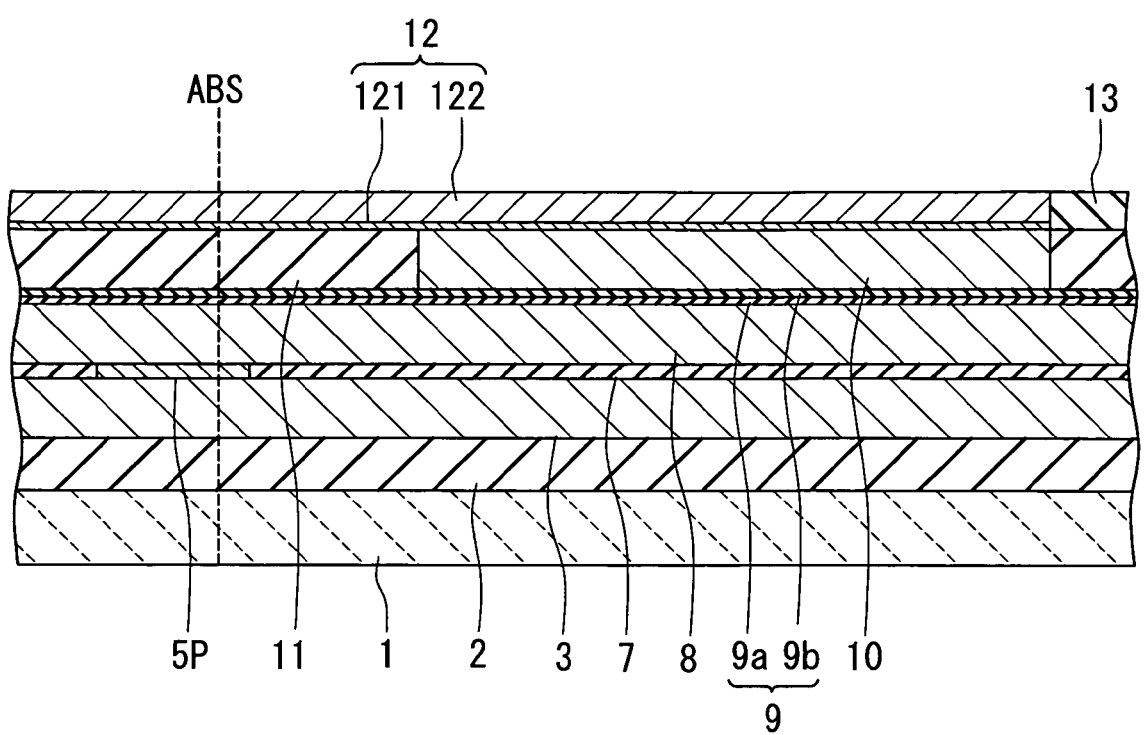
FIG. 12 is a cross-sectional view of a layered structure obtained in the course of the process of fabricating the substructure of the first embodiment of the invention.

In the following step of the embodiment, a plurality of write head portions each of which will be the write head later are formed (Step S104). This step will now be described with reference to FIG. 12 to FIG. 15. FIG. 12 illustrates a cross section of a layered structure obtained in the course of the process of fabricating the substructure 100, the cross section being perpendicular to the plane ABS and the top surface 1a of the substrate 1. In Step S104, first, the insulating film 9a is formed on the second read shield layer 8. Next, the heater 19 of FIG. 2 and two leads not shown are formed on the insulating film 9a. Next, the insulating film 9b is formed on the insulating film 9a and the heater 19. Next, the yoke layer 10 and the insulating layer 11 are formed on the separating layer 9 made up of the insulating films 9a and 9b. Next, the pole layer 12 and the insulating layer 13 are formed on the yoke layer 10 and the insulating layer 11.

Figure 13:
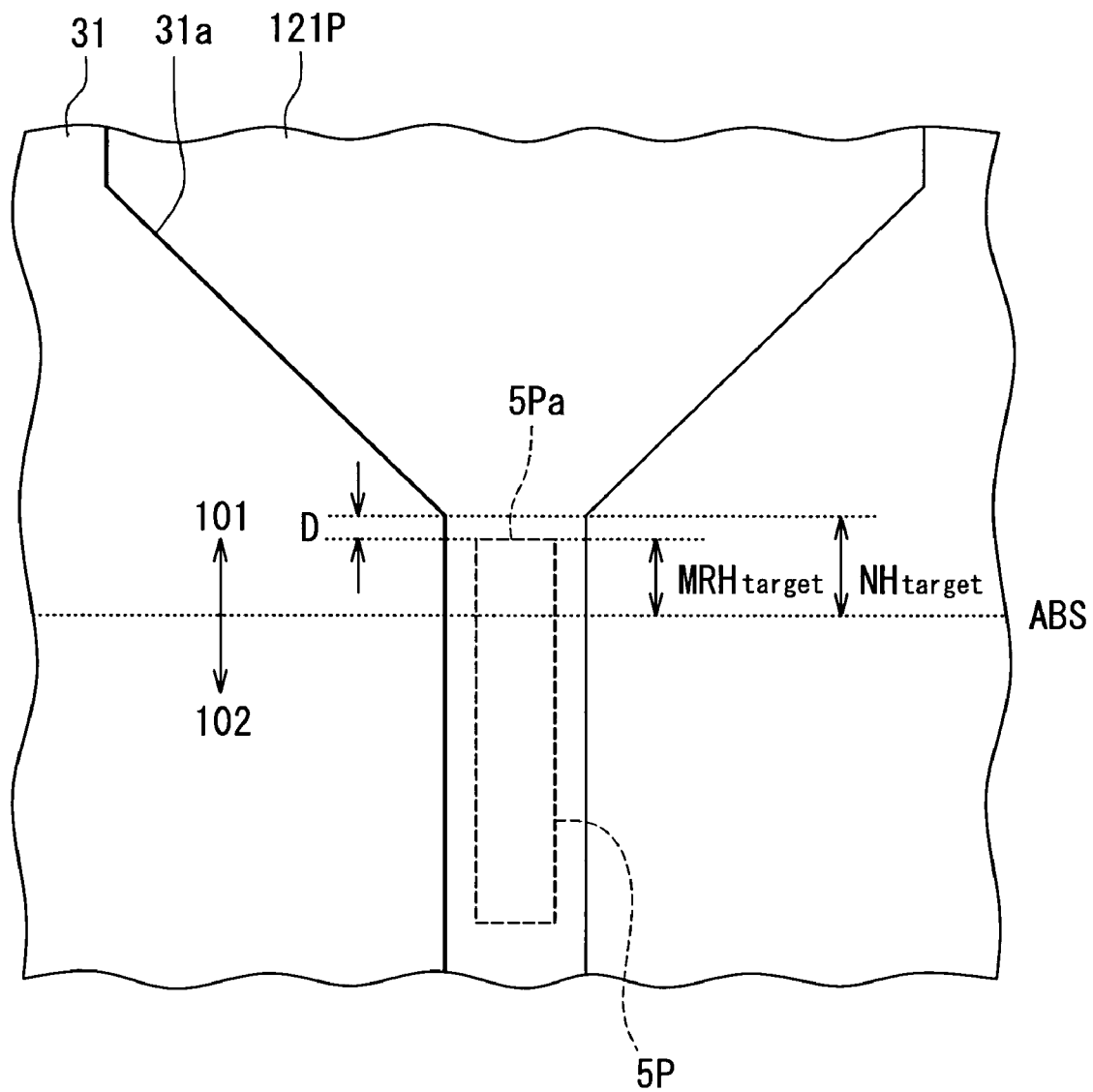
FIG. 13 is a top view of a layered structure obtained in the course of the process of fabricating the substructure of the first embodiment of the invention.
Figure 14:
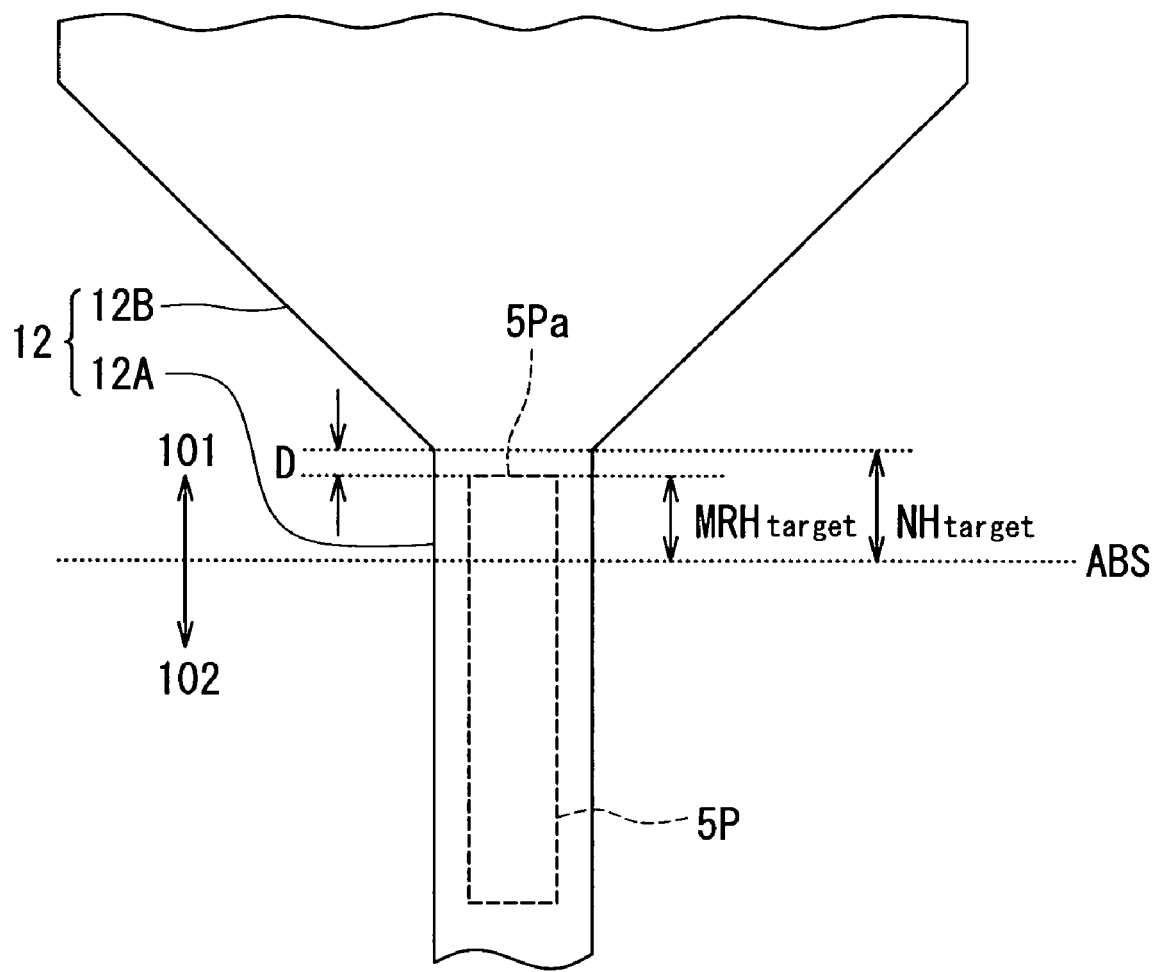
FIG. 14 is a top view of a layered structure obtained in the course of the process of fabricating the substructure of the first embodiment of the invention.

The pole layer 12 may be formed by frame plating or may be formed by making an unpatterned magnetic layer and then patterning this magnetic layer by etching. Here, a method of forming the pole layer 12 by frame plating will be described by way of example, referring to FIG. 13 and FIG. 14. Each of FIG. 13 and FIG. 14 is a top view of a layered structure obtained in the course of the process of fabricating the substructure 100. In this method, as shown in FIG. 13, an electrode film 121P for plating made of a magnetic material is first formed on the yoke layer 10 and the insulating layer 11. Next, a photoresist layer is formed on the electrode film 121P. Next, the photoresist layer is patterned to form a frame 31. The frame 31 has an opening 31a having a shape corresponding the shape of the pole layer 12 to be formed. Next, the second layer 122 is formed by frame plating on the electrode film 121P in the opening 31a of the frame 31. The frame 31 is then removed. Next, the electrode film 121P except a portion thereof located below the second layer 122 is removed by etching. The remaining portion of the electrode film 121P becomes the first layer 121. The pole layer 12 having the track width defining portion 12A and the wide portion 12B is thus formed, as shown in FIG. 14. At this point, the track width defining portion 12A extends over the plane ABS and reaches the inter-row portion to be removed 102.

In the embodiment, in the step of forming the pole layer 12, the pole layer 12 is formed such that the actual position of the boundary between the track width defining portion 12A and the wide portion 12B coincides with the target position determined in Step S103. To be specific, as shown in FIG. 14, the target position of the boundary between the track width defining portion 12A and the wide portion 12B is determined to be the position away from the end 5Pa of the MR film 5P by the difference D obtained from Equation (2) in Step S103 along the direction orthogonal to the plane ABS. The target position of the boundary between the track width defining portion 12A and the wide portion 12B is also the position away from the target position of the medium facing surface 20 (the position of the plane ABS), determined in Step S103, by a distance equal to the target value $NH_{target}$ of the neck height NH.

While FIG. 9 illustrates that Steps S102 and S103 are performed before Step S104 for the sake of convenience, Steps S102 and S103 can be performed at any stage after Step S101 and before the step of forming the frame 31 in Step S104.

Figure 15:
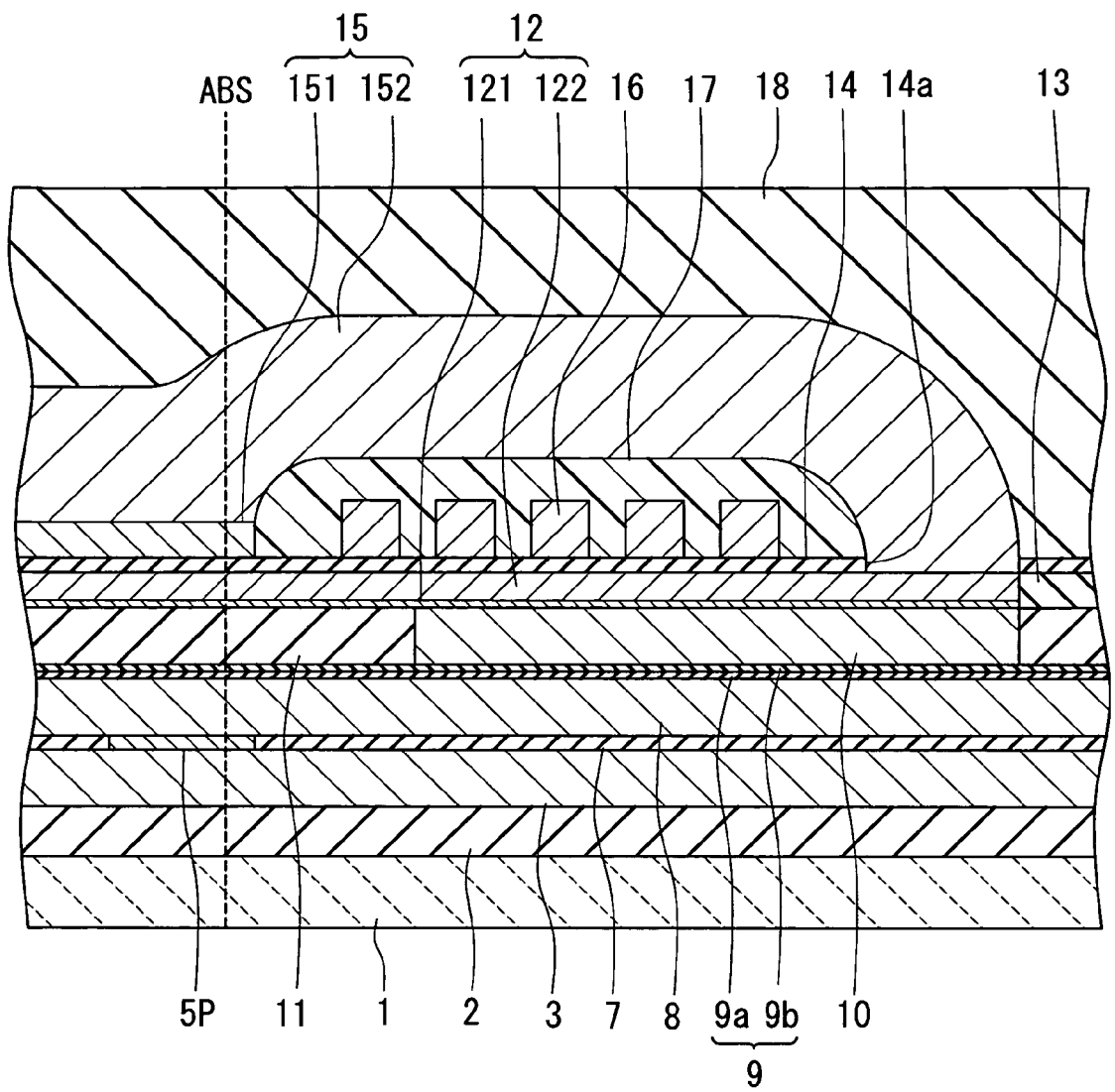
FIG. 15 is a cross-sectional view of the substructure of the first embodiment of the invention.

FIG. 15 illustrates the step that follows the step of FIG. 12. FIG. 15 shows a cross section of the substructure 100 perpendicular to the plane ABS and the top surface 1a of the substrate 1. In the step, first, the gap layer 14 is formed on the pole layer 12. Next, the first layer 151 of the write shield layer 15 and the coil 16 are formed on the gap layer 14. Next, the insulating layer 17 is formed to cover the coil 16. Next, the second layer 152 of the write shield layer 15 is formed. At this point, each of the first layer 151 and the second layer 152 extends over the plane ABS and reaches the inter-row portion to be removed 102. Next, the overcoat layer 18 is formed.

Next, wiring and terminals and so on are formed on the overcoat layer 18. In each of the pre-head portions 101, two terminals connected to the MR element 5 and two terminals connected to the coil 16 are formed on the overcoat layer 18.

As thus described, the components of a plurality of magnetic heads are formed on the single substrate 1 to thereby fabricate the substructure 100 in which the pre-head portions 101 each of which will be the magnetic head later are aligned in a plurality of rows, as shown in FIG. 5 and FIG. 6.

Figure 16:
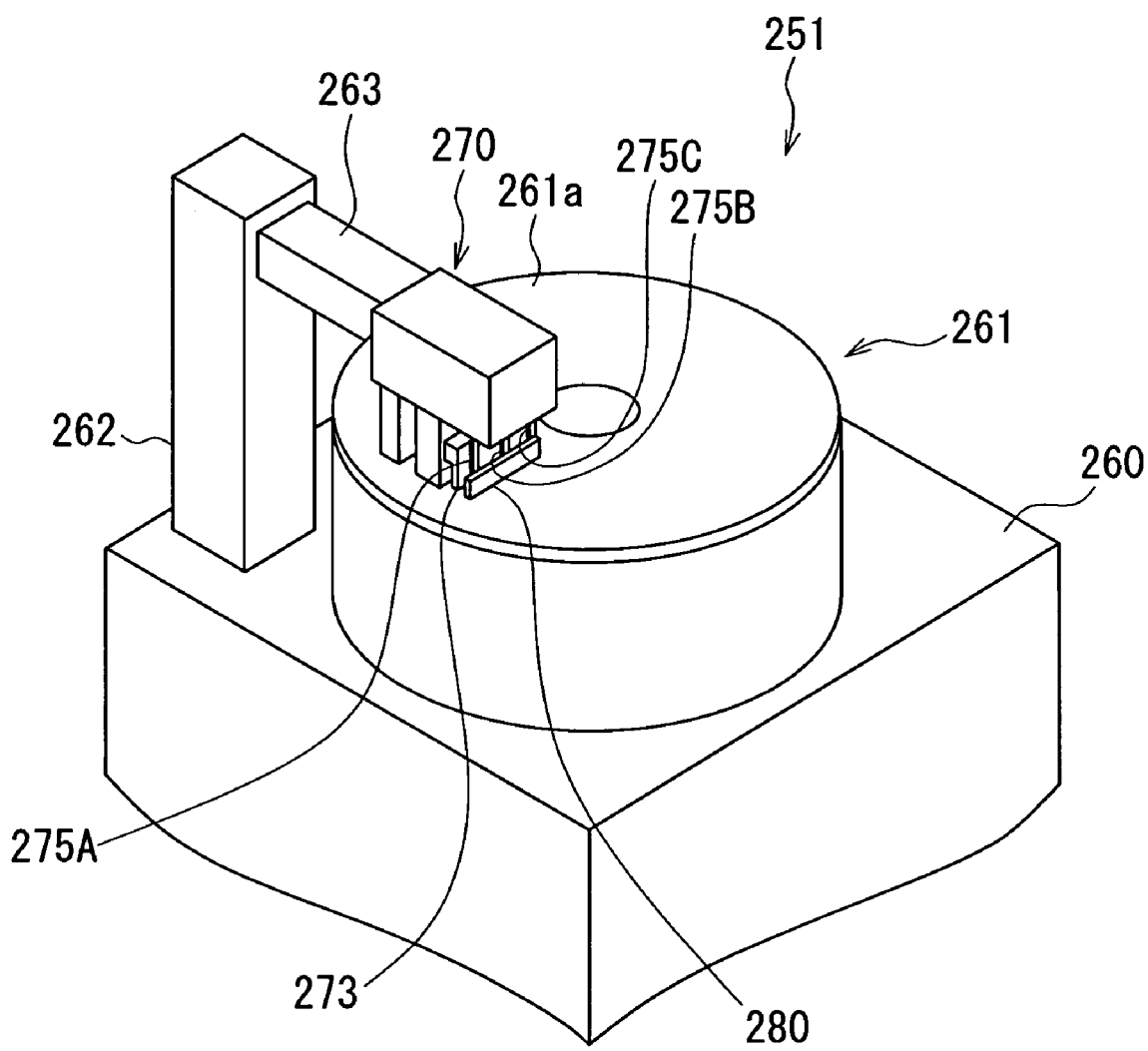
FIG. 16 is a perspective view for illustrating an example of the configuration of a lapping apparatus for lapping a head aggregate of the first embodiment of the invention.
Figure 17:
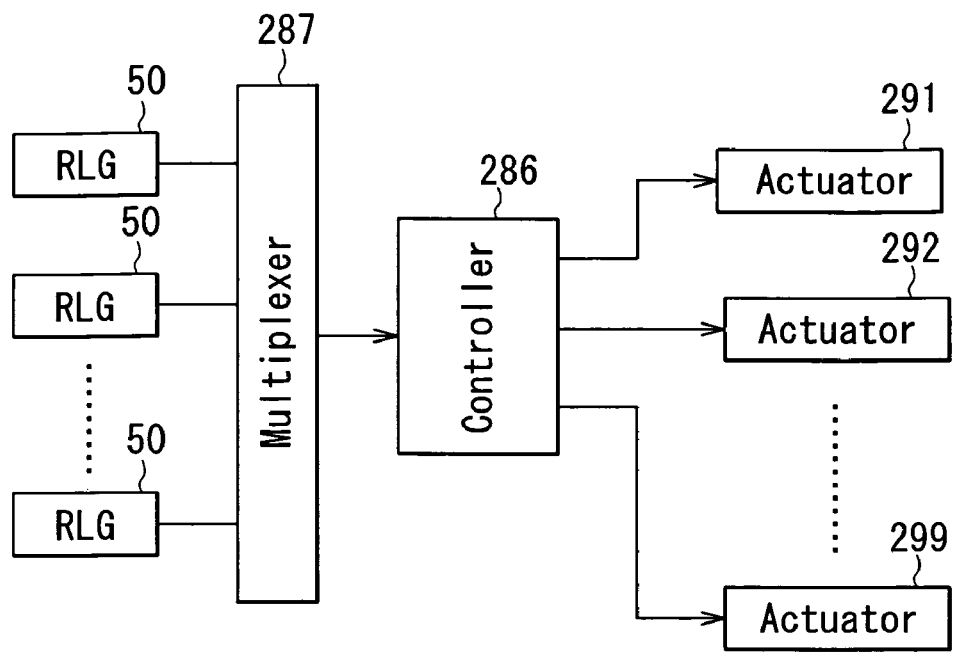
FIG. 17 is a block diagram illustrating an example of circuit configuration of the lapping apparatus of FIG. 16.

Reference is now made to FIG. 16 and FIG. 17 to describe the step of fabricating the magnetic heads (Steps S105 to S107) in detail. In the step, first, the substructure 100 is cut at positions within the inter-row portions to be removed 102 shown in FIG. 6 to thereby fabricate head aggregates each of which includes a plurality of pre-head portions 101 aligned in a row (Step S105).

Next, a surface (the surface closer to the plane ABS) formed in each of the head aggregates by cutting the substructure 100 is lapped to thereby form the medium facing surface 20 for each of the pre-head portions 101 included in each of the head aggregates (Step S106). In this step of forming the medium facing surface 20 (Step S106), the lapping is performed such that the MR film 5P is lapped and the resistance thereof thereby reaches a predetermined value, that is, the target value $MRR_{target}$, and as a result, the MR film 5P is formed into the MR element 5. In the step of forming the medium facing surface 20, the track width defining portion 12A, the first layer 151 and the second layer 152 are also lapped.

When the surface formed by cutting the substructure 100 is lapped in the step of forming the medium facing surface 20 (Step S106), both the MR film 5P and the RLG 50 are lapped and the resistances thereof are thereby changed. The RLG 50 has a resistance that changes in predetermined correspondence with the resistance of the MR film 5P when the foregoing lapping is performed. It is therefore possible to recognize the resistance of the MR film 5P from the resistance of the RLG 50. Consequently, when lapping is performed to form the medium facing surface 20, it is possible to perform the lapping so that the resistance of the MR film 5P becomes equal to the target value $MRR_{target}$ by monitoring the resistance of the RLG 50.

FIG. 16 is a perspective view illustrating an example of configuration of a lapping apparatus for lapping the head aggregate. This lapping apparatus 251 incorporates: a table 260; a rotating lapping table 261 provided on the table 260; a strut 262 provided on the table 260 on a side of the rotating lapping table 261; and a supporter 270 attached to the strut 262 through an arm 263. The rotating lapping table 261 has a lapping plate (surface plate) 261a to come to contact with the surface to be the medium facing surfaces 20 of the pre-head portions 101 that the head aggregate includes.

The supporter 270 incorporates a jig retainer 273 and three load application rods 275A, 275B and 275C placed in front of the jig retainer 273 at equal spacings. A jig 280 is to be fixed to the jig retainer 273. The jig 280 has three load application sections each of which is made up of a hole having an oblong cross section. Load application pins are provided at the lower ends of the load application rods 275A, 275B and 275C, respectively. The load application pins have respective heads to be inserted to the load application sections (holes) of the jig 280, the heads each having an oblong cross section. Each of the load application pins is driven by an actuator (not shown) in the vertical, horizontal (along the length of the jig 280) and rotational directions.

The jig 280 has a retainer for retaining the head aggregate. With this jig 280, the retainer and the head aggregate are deformed by applying loads in various directions to the three load application sections. This makes it possible to lap the surface to become the medium facing surfaces 20 of the pre-head portions 101 included in the head aggregate while performing control so that the MR heights and neck heights of the plurality of pre-head portions 101 included in the head aggregate become equal to the respective target values.

FIG. 17 is a block diagram showing an example of circuit configuration of the lapping apparatus shown in FIG. 16. This lapping apparatus incorporates: nine actuators 291 to 299 for applying loads in the three directions to the load application sections of the jig 280; a controller 286 for controlling the actuators 291 to 299 through monitoring the resistances of the plurality of RLGs 50 in the head aggregate; and a multiplexer 287, connected to the plurality of RLGs 50 in the head aggregate through a connector (not shown), for selectively connecting one of the RLGs 50 to the controller 286.

In this lapping apparatus, the controller 286 monitors the resistances of the plurality of RLGs 50 in the head aggregate through the multiplexer 287, and controls the actuators 291 to 299 so that the resistance of each of the plurality of the MR films 5P in the head aggregate becomes equal to the target value $MRR_{target}$ of the resistance of the MR element 5 or falls within a tolerance of the target value $MRR_{target}$.

In the embodiment, it is possible to make the neck height NH equal to the target value $NH_{target}$ by forming the medium facing surface 20 such that the resistance of the MR film 5P is equal to the target value $MRR_{target}$.

Flying rails are formed by etching, for example, in the medium facing surfaces 20 formed by lapping as described above. The head aggregate is then cut at the positions of the intra-row portions to be removed 103 of FIG. 6 to separate the plurality of pre-head portions 101 from one another, whereby a plurality of magnetic heads are formed (Step S107).

The specific details of the step of fabricating the magnetic heads are not limited to the example described above. For example, the magnetic heads may be fabricated in the following manner. First, the substructure 100 is cut to fabricate a first head aggregate that includes a plurality of pre-head portions 101 aligned in a plurality of rows. Next, a surface of the first head aggregate is lapped to form the medium facing surfaces 20 for one of the rows of pre-head portions 101. Next, the first head aggregate is cut so that the one of the rows of pre-head portions 101 whose medium facing surfaces 20 have been formed is separated to be a second head aggregate. Next, the second head aggregate is cut so that the plurality of pre-head portions 101 are separated from one another, whereby a plurality of magnetic heads are formed.

According to the embodiment as thus described, in the step of fabricating the substructure 100, the resistance of the MR film 5P is detected, and the target position of the boundary between the track width defining portion 12A and the wide portion 12B of the pole layer 12 is determined based on the resistance $MRR_{wf}$ of the MR film 5P detected, and the pole layer 12 is formed such that the actual position of the boundary between the track width defining portion 12A and the wide portion 12B coincides with the target position. In the step of fabricating the magnetic heads, the surface formed by cutting the substructure 100 is lapped such that the MR film 5P is lapped and the resistance thereof thereby reaches a predetermined value $MRR_{target}$, and as a result, the MR film 5P is formed into the MR element 5. According to the embodiment, it is thereby possible to reduce variations in both resistance of the MR element 5 and the neck height NH of the pole layer 12.

The shapes and locations of the MR film 5P and the RLG 50 are predetermined so that the correspondence between the resistance of the MR film 5P and the resistance of the RLG 50 in the step of forming the medium facing surface 20 is a specific relationship. To enhance the accuracy of control over the resistance of the MR film 5P performed by monitoring the resistance of the RLG 50, the correspondence between the resistance of the MR film 5P and the resistance of the RLG 50 in the step of forming the medium facing surface 20 may be determined for each substructure 100 through the following first or second method, for example. According to the first method, one of a plurality of head aggregates obtained by cutting the substructure 100 in Step S105 is used and a surface formed in this head aggregate by cutting the substructure 100 is lapped while measuring the resistance of the MR film 5P and the resistance of the RLG 50. The correspondence between the resistance of the MR film 5P and the resistance of the RLG 50 in the step of forming the medium facing surface 20 is thereby determined. According to the second method, the resistance of the MR film 5P and the resistance of the RLG 50 are measured when in the state of the substructure 100. Based on the measurement results and the information on the shapes and locations of the MR film 5P and the RLG 50, the correspondence between the resistance of the MR film 5P and the resistance of the RLG 50 in the step of forming the medium facing surface 20 is determined by calculation.

A specific example will now be given to further describe the effects of the embodiment. A standard example will be first given. In this example, the resistance-area product RA of the MR film 5P and the MR element 5 is 3 $\Omega$-$\mu m^2$. The width MRT of the MR film 5P and the MR element 5 is 0.08 μm. The length $MRH_{wf}$ of the MR film 5P as initially formed is 0.5 μm. The target value $MRH_{target}$ of the MR height is 0.1 μm. The resistance $MRR_{wf}$ of the MR film 5P as initially formed is 75Ω. The target value $MRR_{target}$ of the resistance of the MR element 5 is 375Ω. These values are shown together on Table 1 below.

TABLE 1

| | MR film 5P | MR element 5 |
|---|---|---|
| RA ($\Omega$-$\mu m^2$) | 3 | 3 |
| MRT (μm) | 0.08 | 0.08 |
| Length (μm) | ($MRH_{wf}$) 0.5 | ($MRH_{target}$) 0.1 |
| Resistance (Ω) | ($MRR_{wf}$) 75 | ($MRR_{target}$) 375 |

In this example the target value $NH_{target}$ of the neck height NH is 0.12 μm. If the MR film 5P and the MR element 5 conform to the above-listed standard, the difference D between the neck height NH and the MR height MRH is 0.02 μm.

Consideration will now be given to a case in which the resistance $MRR_{wf}$ of the MR film 5P deviates from the above-listed standard value 75Ω due to variations in resistance-area product and/or width MRT of the MR film 5P. In this case, too, it is possible to make the resistance of the MR element 5 be of a uniform value equal to the target value $MRR_{target}$ if the target value $MRH_{target}$ of the MR height is determined by using Equation (1) and the MR element 5 is formed such that the actual MR height MRH is equal to the target value $MRH_{target}$. Here, the following first and second examples will be considered, assuming that the resistance $MRR_{wf}$ of the MR film 5P deviates from the above-listed standard value 75Ω. The first example is one in which the resistance $MRR_{wf}$ is 65Ω. The second example is one in which the resistance $MRR_{wf}$ is 85Ω.

In the first example, the target value $MRH_{target}$ of the MR height determined by using Equation (1) is 0.087 ∥m. In the conventional method of manufacturing a magnetic head, the difference D between the neck height NH and the MR height MRH is determined in advance. As a result, according to the conventional method, in the case of the first example, the actual neck height is of the value obtained by adding 0.02 μm that is the difference D to 0.087 µm that is the target value $MRH_{target}$ of the MR height, that is, the value obtained is 0.107 µm, which is smaller than 0.12 µm that is the target value $NH_{target}$.

In the second example, the target value $MRH_{target}$ of the MR height determined by using Equation (1) is 0.113 µm. Therefore, according to the conventional method of manufacturing a magnetic head, in the case of the second example, the actual neck height is of the value obtained by adding 0.02 µm that is the difference D to 0.113 µm that is the target value $MRH_{target}$ of the MR height, that is, the value obtained is 0.133 µm, which is greater than 0.12 µm that is the target value $NH_{target}$.

In the embodiment, in contrast, the difference D is determined by using Equation (2) based on the resistance $MRR_{wf}$ of the MR film 5P. As a result, according to the embodiment, in the first example, the difference D is 0.033 µm, and the actual neck height is of the value obtained by adding 0.033 µm that is the difference D to 0.087 µm that is the target value $MRH_{target}$ of the MR height, that is, the value obtained is 0.12 µm, which is equal to the target value $NH_{target}$. In the second example, the difference D is 0.007 µm, and the actual neck height is of the value obtained by adding 0.007 µm that is the difference D to 0.113 µm that is the target value $MRH_{target}$ of the MR height, that is, the value obtained is 0.12 µm, which is equal to the target value $NH_{target}$.

Figure 18:
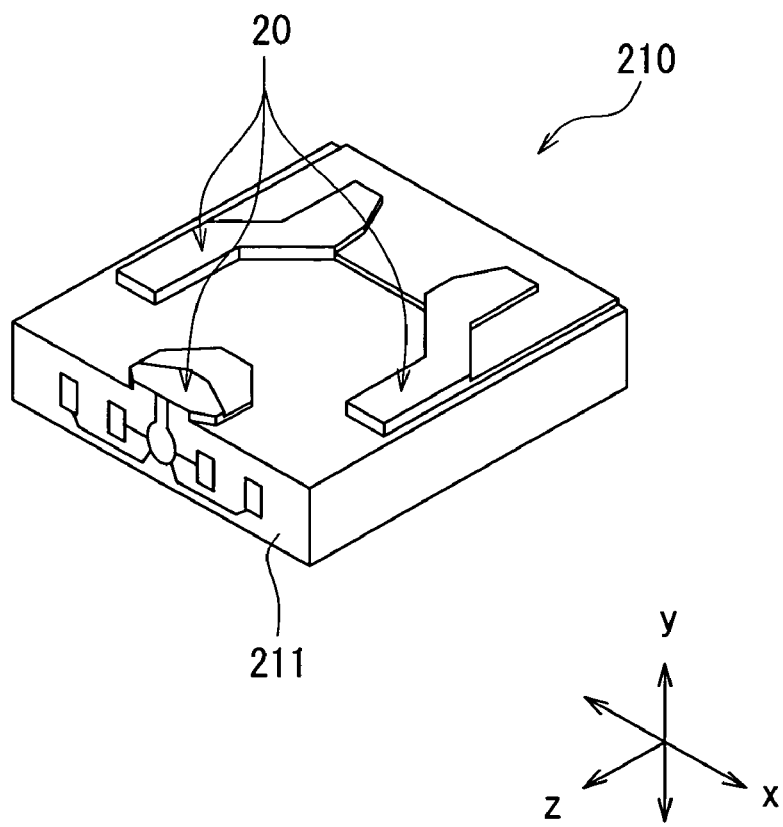
FIG. 18 is a perspective view for illustrating an example of appearance of the magnetic head of the first embodiment of the invention.

Reference is now made to FIG. 18 to FIG. 21 to describe a head gimbal assembly, a head arm assembly and a magnetic disk drive each of which employs the magnetic head of the embodiment. Reference is first made to FIG. 18 to describe an example of appearance of the magnetic head of the embodiment. The magnetic head of FIG. 18 is in the form of a slider. Therefore, the magnetic head is called a slider 210 in FIG. 18 to FIG. 21. In the magnetic disk drive, the slider 210 is placed to face toward a magnetic disk platter that is a circular-plate-shaped recording medium to be driven to rotate. The slider 210 has a base body 211 made up mainly of the substrate 1 and the overcoat layer 18 of FIG. 2. The base body 211 is nearly hexahedron-shaped. One of the six surfaces of the base body 211 faces toward the magnetic disk platter. The medium facing surface 20 is formed in this one of the surfaces. When the magnetic disk platter rotates in the z direction of FIG. 18, an airflow passes between the magnetic disk platter and the slider 210, and a lift is thereby generated below the slider 210 in the y direction of FIG. 18 and exerted on the slider 210. The slider 210 flies over the magnetic disk platter by means of the lift. The x direction of FIG. 18 is across the tracks of the magnetic disk platter. The read head and the write head are formed near the air-outflow-side end (the end located at the lower left of FIG. 18) of the slider 210.

Figure 19:
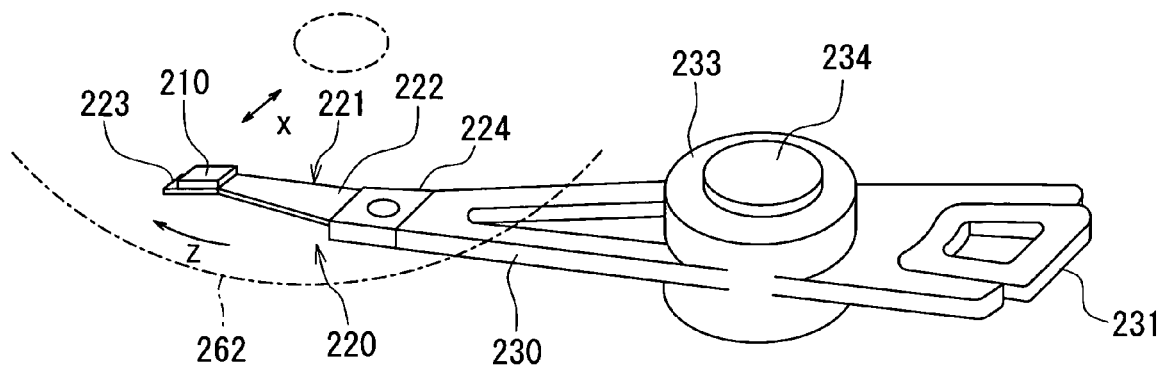
FIG. 19 is a perspective view of a head arm assembly of the first embodiment of the invention.

Reference is now made to FIG. 19 to describe the head gimbal assembly 220. The head gimbal assembly 220 incorporates the slider 210 and a suspension 221 that flexibly supports the slider 210. The suspension 221 incorporates: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator incorporates the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly incorporating the arm 230 and the head gimbal assembly 220 attached to the arm 230 is called a head arm assembly. An assembly incorporating a carriage having a plurality of arms wherein the head gimbal assembly 220 is attached to each of the arms is called a head stack assembly.

FIG. 19 illustrates the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 20:
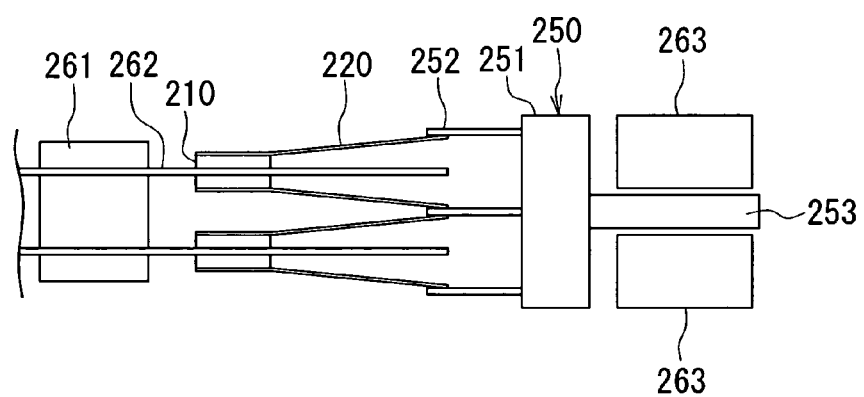
FIG. 20 is a view for illustrating a main part of a magnetic disk drive of the first embodiment of the invention.
Figure 21:
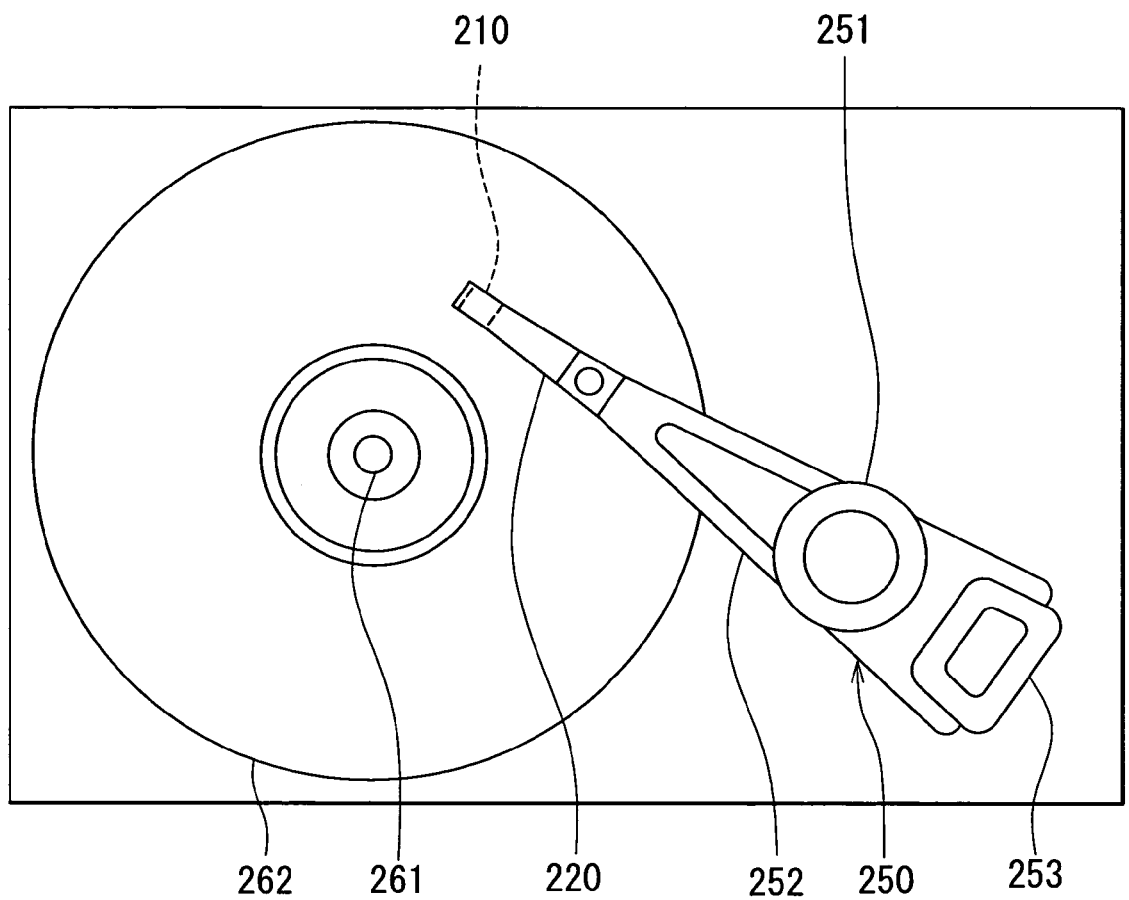
FIG. 21 is a top view of the magnetic disk drive of the first embodiment of the invention.

Reference is now made to FIG. 20 and FIG. 21 to describe an example of the head stack assembly and the magnetic disk drive. FIG. 20 illustrates the main part of the magnetic disk drive. FIG. 21 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263. The actuator and the head stack assembly 250 except the sliders 210 support the sliders 210 and align them with respect to the magnetic disk platters 262.

In the magnetic disk drive, the actuator moves the slider 210 across the tracks of the magnetic disk platter 262 and aligns the slider 210 with respect to the magnetic disk platter 262. The write head incorporated in the slider 210 writes data on the magnetic disk platter 262 and the read head incorporated in the slider 210 reads data stored on the magnetic disk platter 262.

Second Embodiment

Figure 22:
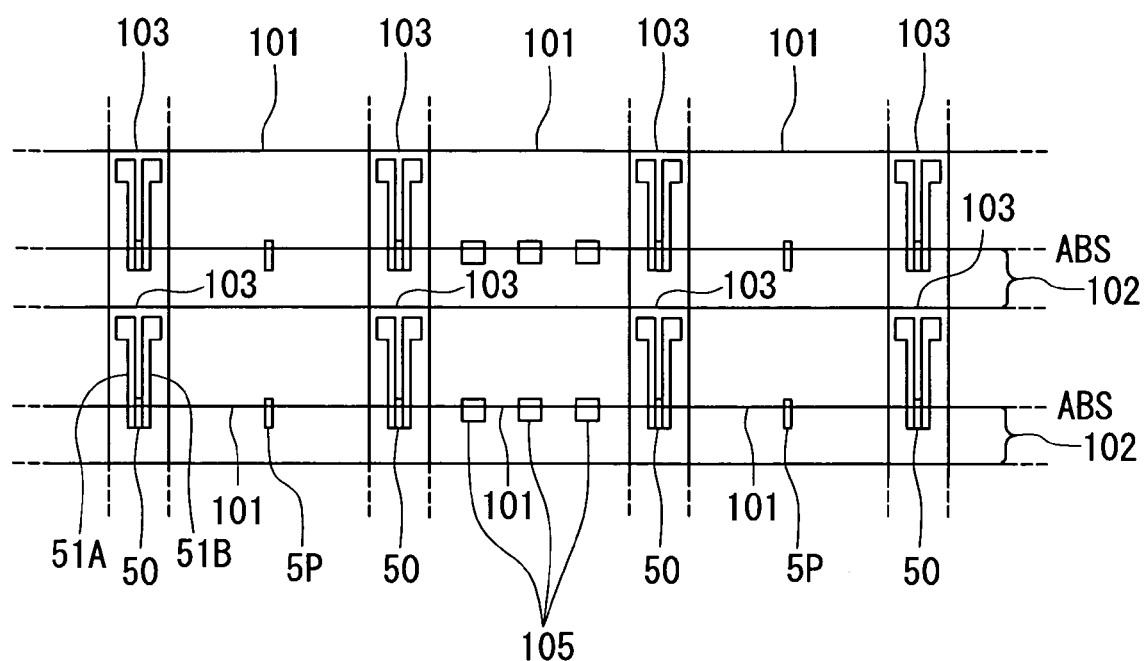
FIG. 22 is a view for illustrating part of a substructure of a second embodiment of the invention.
Figure 23:
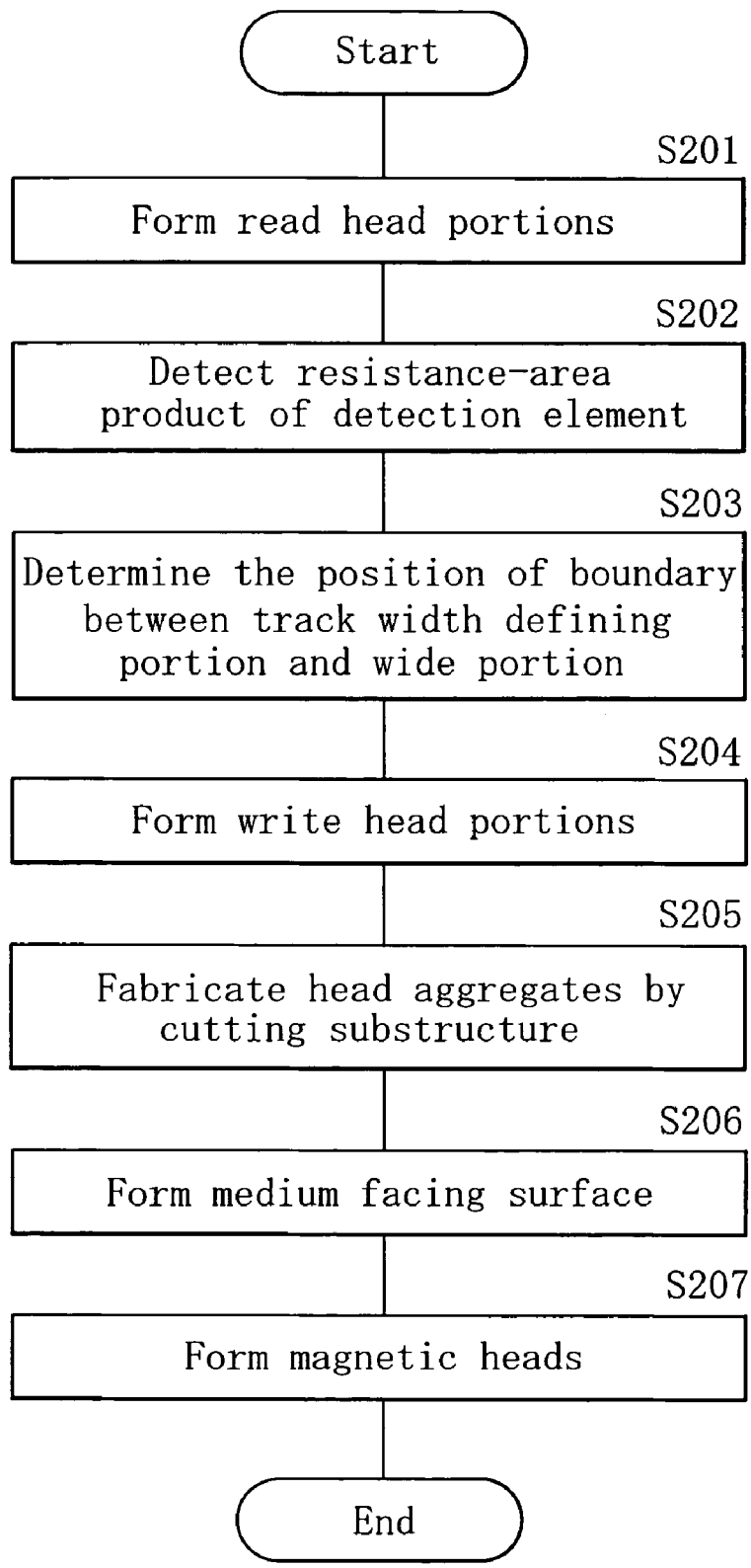
FIG. 23 is a flow chart for showing the outline of a method of manufacturing a magnetic head of the second embodiment of the invention.

Reference is now made to FIG. 22 and FIG. 23 to describe a method of manufacturing a magnetic head and a method of manufacturing a substructure of a second embodiment of the invention. Reference is first made to FIG. 22 to describe the substructure 100 of the second embodiment. FIG. 22 is a view for illustrating part of the substructure 100 of the embodiment. The substructure 100 of the second embodiment incorporates a plurality of detection elements 105 each having a film configuration the same as that of the MR film 5P. Since each of the detection elements 105 has the same film configuration as that of the MR film 5P, each of the detection elements 105 has a resistance-area product the same as that of the MR film 5P. Each of the detection elements 105 may have a shape the same as that of the MR film 5P or different from that of the MR film 5P. The detection elements 105 may be disposed inside or outside the respective pre-head portions 101, or may be disposed to extend across the inside and the outside of the respective pre-head portions 101. FIG. 22 illustrates an example in which the MR films 5P are not formed in some of the pre-head portions 101, and the detection elements 105 are respectively disposed to extend across each of these pre-head portions 101 without the MR films 5P and part of the adjacent inter-row portion to be removed 102. In this example, the pre-head portions 101 in which the detection elements 105 are disposed will not be used as magnetic heads even after they are separated later. The detection elements 105 are formed at the same time as the MR films 5P are formed.

The substructure 100 of the second embodiment further incorporates first and second electrodes disposed to sandwich the respective detection elements 105. The first and second electrodes are used to feed a current to each of the detection elements 105 when detecting the resistances of the detection elements 105. The first electrodes are formed at the same time as the first read shield layers 3, for example. The second electrodes are formed at the same time as the second read shield layers 8, for example.

In the embodiment, the value of a parameter having a correspondence with the resistance of the MR film 5P is detected through the use of the detection elements 105, and the target position of the boundary between the track width defining portion 12A and the wide portion 12B of the pole layer 12 is determined based on the value of the parameter detected.

Reference is now made to a flowchart of FIG. 23 to describe the method of manufacturing the magnetic head of the embodiment. In FIG. 23 Steps S201 to S204 are included in the step of fabricating the substructure 100, and Steps S205 to S207 are included in the step of fabricating the magnetic heads.

In the step of fabricating the substructure 100, first, a plurality of read head portions each of which will be the read head later are formed on a single substrate (Step S201). As in the first embodiment, each of the read head portions includes the MR film 5P that will be formed into the MR element 5 by undergoing lapping later. Therefore, the step of forming the read head portions (Step S201) includes the step of forming the MR films 5P. The RLGs 50 are also formed in the step of forming the read head portions. In the second embodiment, in addition, the detection elements 105 and the first and second electrodes are formed in the step of forming the read head portions.

Next, the value of the resistance-area product of the detection element 105 is detected as the value of the parameter having a correspondence with the resistance of the MR film 5P (Step S202). If the top surface of the detection element 105 is rectangle-shaped as in the case of the MR film 5P, it is possible to obtain the value of the resistance-area product of the detection element 105 as the product of the resistance of the detection element 105, the length of the detection element 105, and the width of the detection element 105. Since the length and width of the detection element 105 are determined in advance, it is possible to obtain the value of the resistance-area product of the detection element 105 by detecting the resistance thereof. If the two side surfaces of the detection element 105 are not perpendicular to the top surface 1a of the substrate 1 as in the case of the MR element 5 of FIG. 4, the width of the detection element 105 is defined in a manner the same as that of the MR element 5 of FIG. 4, depending on the film configuration of the detection element 105.

Here, the value of the resistance-area product of the detection element 105 detected in Step S202 is indicated with $RA_{wf}$. In the second embodiment it is possible to obtain the resistance $MRR_{wf}$ of the MR film 5P from Equation (3) below, based on the resistance-area product $RA_{wf}$ of the detection element 105.

$$MRR_{wf} = RA_{wf}/(MRT \times MRH_{wf}) \qquad (3)$$

Then, by substituting the resistance $MRR_{wf}$ obtained from Equation (3) into Equation (1), it is possible to obtain the target value $MRH_{target}$ of the MR height. Therefore, according to the second embodiment, it is possible to obtain the target value $MRH_{target}$ of the MR height based on the value of the resistance-area product $RA_{wf}$ of the detection element 105, even without detecting the resistance $MRR_{wf}$ of the MR film 5P.

Next, based on the value of the resistance-area product $RA_{wf}$ of the detection element 105 detected in Step S202, the target position of the boundary between the track width defining portion 12A and the wide portion 12B of the pole layer 12 is determined (Step S203). To be specific, the difference D between the neck height NH and the MR height MRH of FIG. 1 is obtained from Equation (4) below.

$$\begin{aligned} D &= NH_{target} - MRH_{target} \\ &= NH_{target} - RA_{wf}/(MRT \times MRR_{target}) \end{aligned} \qquad (4)$$

As in the first embodiment, the target position of the boundary between the track width defining portion 12A and the wide portion 12B is the position away from the end 5Pa of the MR film 5P by the difference D along the direction orthogonal to the plane ABS.

In Step S202, it is preferred to detect the resistance and the value of the resistance-area product $RA_{wf}$ of the detection element 105 while a magnetic field is applied to the detection element 105. In particular, in the case in which each of the MR film 5P and the detection element 105 includes the pinned layer 23, the free layer 25 and the spacer layer 24 as shown in FIG. 4, for example, in Step S202 it is preferred to detect the resistance and the value of the resistance-area product $RA_{wf}$ of the detection element 105 with the direction of magnetization of the free layer 25 rendered parallel to the direction of magnetization of the pinned layer 23 by applying a magnetic field to the detection element 105. By detecting the resistance and the value of the resistance-area product $RA_{wf}$ of the detection element 105 in this manner, the accuracy in detection of the value of the resistance-area product $RA_{wf}$ of the detection element 105 is enhanced, and consequently the accuracy in the target position of the boundary between the track width defining portion 12A and the wide portion 12B is also enhanced.

Next, a plurality of write head portions each of which will be the write head later are formed (Step S204). Each of the write head portions includes the pole layer 12. Therefore, the step of forming the write head portions (Step S204) includes the step of forming the pole layers 12. In the step of forming the pole layers 12, each of the pole layers 12 is formed such that the actual position of the boundary between the track width defining portion 12A and the wide portion 12B coincides with the target position determined in Step S203.

The substructure 100 is thus fabricated through the foregoing steps. The step of fabricating the magnetic heads of the second embodiment is the same as that of the first embodiment. That is, first, the substructure 100 is cut at positions within the inter-row portions to be removed 102 shown in FIG. 6 to thereby fabricate a plurality of head aggregates each of which includes a plurality of pre-head portions 101 aligned in a row (Step S205). Next, lapping is performed on a surface (the surface closer to the plane ABS) formed in each of the head aggregates by cutting the substructure 100, whereby the medium facing surface 20 is formed for each of the pre-head portions 101 included in each of the head aggregates (Step S206). In this step of forming the medium facing surface 20 (Step S206), the lapping is performed such that the MR film 5P is lapped so that the resistance thereof reaches a predetermined value, that is, the target value MRR$_{target}$, and as a result, the MR film 5P is formed into the MR element 5. In the step of forming the medium facing surface 20, the track width defining portion 12A, the first layer 151 and the second layer 152 are also lapped. In the second embodiment, in the step of forming the medium facing surface 20 (Step S206), the foregoing lapping is performed so that the resistance of the MR film 5P reaches the target value MRR$_{target}$ by monitoring the resistance of the RLG 50. Next, each head aggregate is cut so that the plurality of pre-head portions 101 are separated from one another, whereby a plurality of magnetic heads are formed (Step S207).

In the second embodiment, in the case in which the shape of the detection element 105 is the same as that of the MR film 5P, the target position of the boundary between the track width defining portion 12A and the wide portion 12B may be determined in a manner similar to that of the first embodiment by detecting the resistance of the detection element 105 as the value of the parameter having a correspondence with the resistance of the MR film 5P, and using this resistance of the detection element 105 in place of the resistance of the MR film 5P of the first embodiment.

In the second embodiment, in the case in which the shape of the detection element 105 is the same as that of the MR film 5P and the detection element 105 is disposed such that the positional relationship between the plane ABS and the detection element 105 is the same as that between the plane ABS and the MR film 5P, lapping may be controlled so that the resistance of the detection element 105 is equal to the target value MRR$_{target}$ in the step of forming the medium facing surface 20 (Step S206), instead of controlling lapping so that the resistance of the MR film 5P is equal to the target value MRR$_{target}$.

The remainder of configuration, operation and effects of the second embodiment are similar to those of the first embodiment.

Third Embodiment

Figure 24:
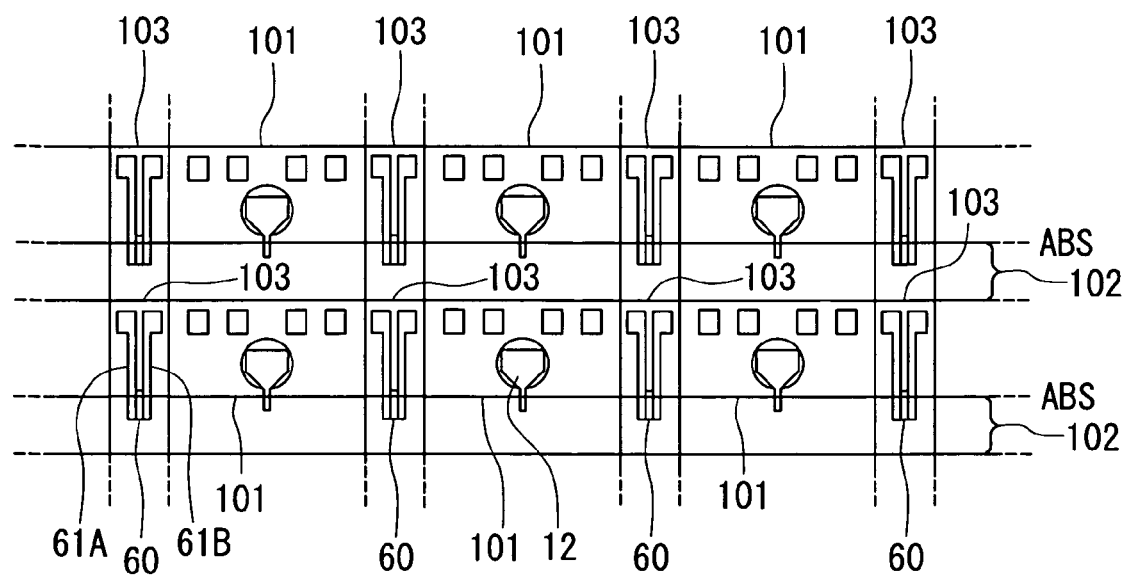
FIG. 24 is a view for illustrating part of a substructure of a third embodiment of the invention.
Figure 25:
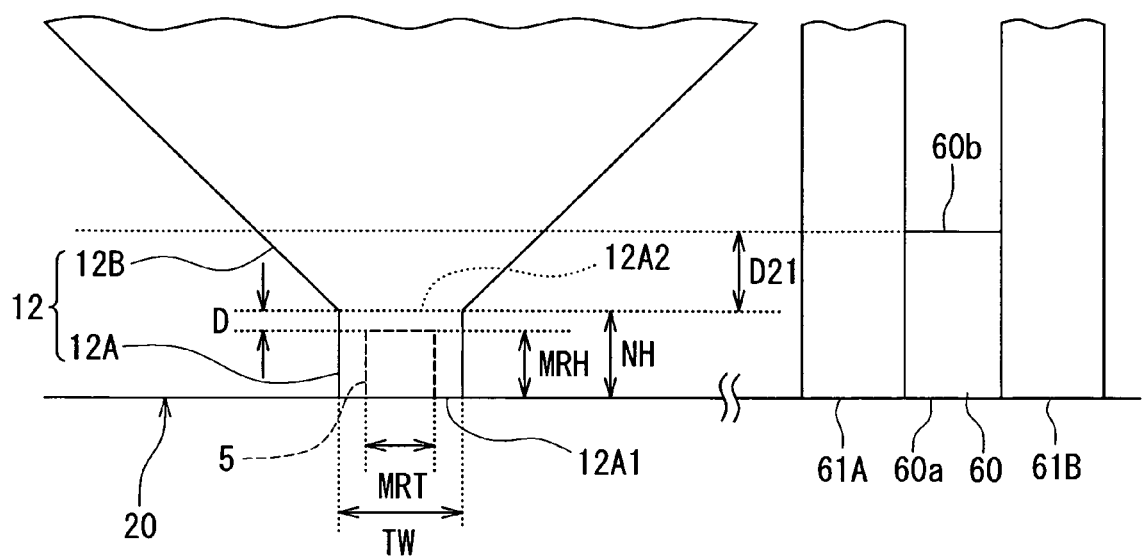
FIG. 25 is a view for illustrating the positional relationship among the MR element, the pole layer and RLG of the third embodiment of the invention.
Figure 26:
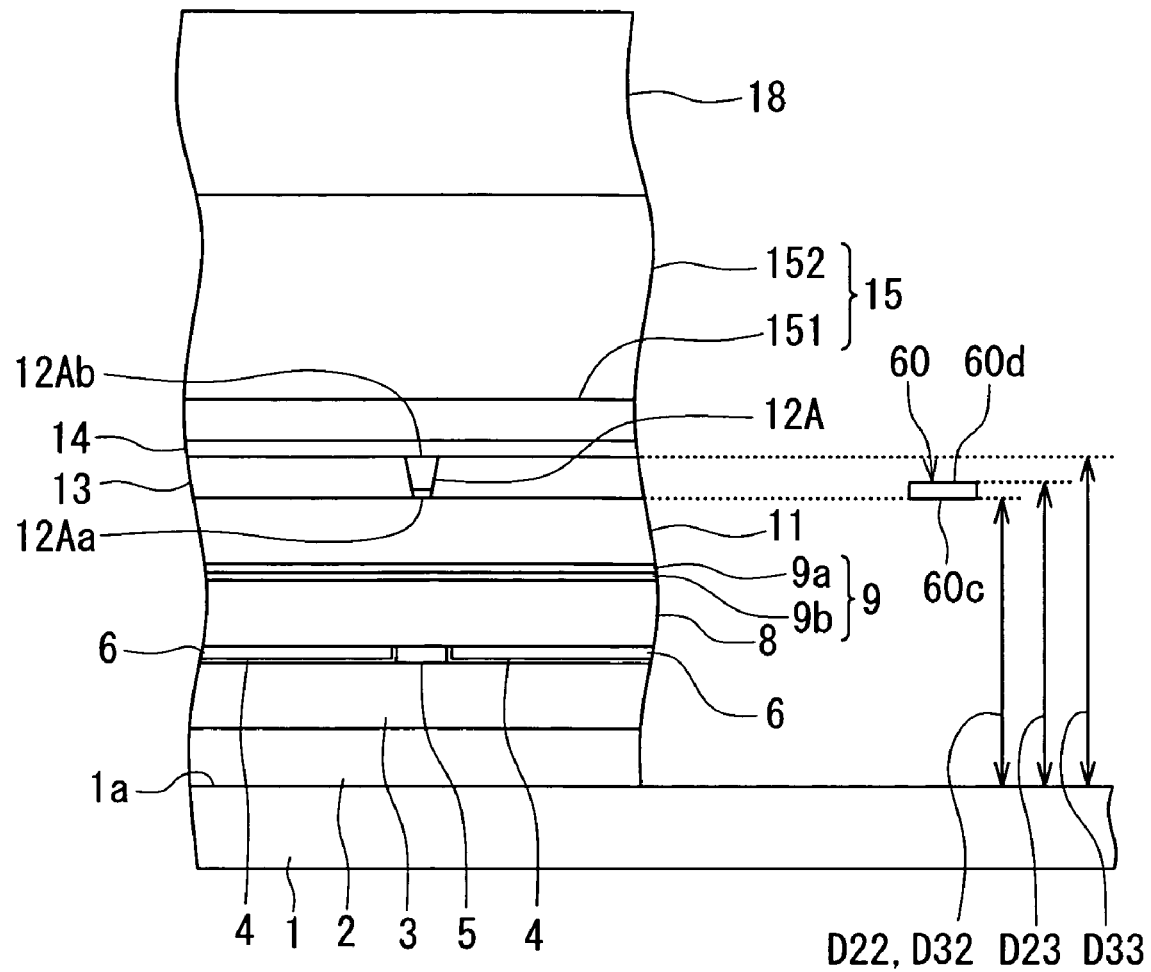
FIG. 26 is a view for illustrating the positional relationship among the MR element, the pole layer and RLG of the third embodiment of the invention.

Reference is now made to FIG. 24 to FIG. 26 to describe a method of manufacturing a magnetic head and a method of manufacturing a substructure of a third embodiment of the invention. Reference is first made to FIG. 24 to describe the substructure 100 of the third embodiment. FIG. 24 is a view for illustrating part of the substructure 100 of the third embodiment. The substructure 100 of the third embodiment incorporates a plurality of RLGs 60 in place of the plurality of RLGs 50 of the first embodiment shown in FIG. 6. Each of the plurality of RLGs 60 is disposed to extend across a different one of the intra-row portions to be removed 103 and part of one of the inter-row portions to be removed 102 adjacent thereto. Like the RLGs 50 of the first embodiment, each of the RLG 60 is a resistor film having a predetermined shape, and corresponds to the resistor element of the invention. Two leads 61A and 61B are connected to each RLG 60 and it is thereby possible to energize the RLG 60 through the two leads 61A and 61B.

The positional relationship among the MR element 5, the pole layer 12 and the RLG 60 will now be described with reference to FIG. 25 and FIG. 26. FIG. 25 and FIG. 26 each illustrate the positional relationship among the MR element 5, the pole layer 12 and the RLG 60 when the medium facing surface 20 has been formed. FIG. 25 illustrates the MR element 5, the pole layer 12 and the RLG 60 as seen in the direction orthogonal to the top surface 1a of the substrate 1. FIG. 26 illustrates the MR element 5, the pole layer 12 and the RLG 60 as seen in the direction orthogonal to the medium facing surface 20.

As shown in FIG. 25, when the medium facing surface 20 has been formed, the RLG 60 has a first end 60a located in the medium facing surface 20 and a second end 60b opposite thereto. There is a difference D21 of a specific value between the distance from the medium facing surface 20 to the second end 60b of the RLG 60 and the distance from the medium facing surface 20 to the boundary between the track width defining portion 12A and the wide portion 12B. The difference D21 may be zero. In the third embodiment, in the step of forming the medium facing surface 20 (Step S106 of FIG. 9), the resistance of the RLG 60 has a correspondence with the distance between the surface being lapped and the boundary between the track width defining portion 12A and the wide portion 12B. It is therefore possible to recognize the distance between the surface being lapped and the boundary between the track width defining portion 12A and the wide portion 12B from the resistance of the RLG 60. Furthermore, as in the first embodiment, the RLG 60 has a resistance that changes in predetermined correspondence with the resistance of the MR film 5P in the step of forming the medium facing surface 20 (Step S106). It is therefore possible to recognize the resistance of the MR film 5P from the resistance of the RLG 60.

As shown in FIG. 26, the RLG 60 is disposed at a distance from the top surface 1a of the substrate 1. The RLG 60 has a bottom surface 60c closer to the top surface 1a of the substrate 1, and a top surface 60d opposite to the bottom surface 60c. The track width defining portion 12A has a bottom surface 12Aa closer to the top surface 1a of the substrate 1, and a top surface 12Ab opposite to the bottom surface 12Aa. The RLG 60 is preferably disposed such that the distance D22 between the bottom surface 60c and the top surface 1a of the substrate 1 is equal to or greater than the distance D32 between the bottom surface 12Aa of the track width defining portion 12A and the top surface 1a of the substrate 1, and that the distance D23 between the top surface 60d and the top surface 1a of the substrate 1 is equal to or smaller than the distance D33 between the top surface 12Ab of the track width defining portion 12A and the top surface 1a of the substrate 1. By way of example, FIG. 26 illustrates the case where the distance D22 between the bottom surface 60c of the RLG 60 and the top surface 1a of the substrate 1 is equal to the distance D32 between the bottom surface 12Aa of the track width defining portion 12A and the top surface 1a of the substrate 1.

A method of forming the RLG 60 will now be described. In this method, first, before the pole layer 12 is formed, a film to become the RLG 60 later is formed by sputtering, for example, on the insulating layer 11. Next, an etching mask is formed on this film by frame plating, for example. Next, a portion of the film to become the RLG 60 not covered with the etching mask is selectively etched by dry etching. Next, the etching mask is removed by wet etching. As a result, the remaining portion of the film becomes the RLG 60. In this case, the distance D22 between the bottom surface 60c of the RLG 60 and the top surface 1a of the substrate 1 becomes equal to the distance D32 between the bottom surface 12Aa of the track width defining portion 12A and the top surface 1a of the substrate 1. Materials employable to form the RLG 60 are the same as those employable to form the RLG 50.

In the case where the pole layer 12 and the etching mask to be used for forming the RLG 60 are both formed by frame plating, it is preferred that the step of forming the pole layer 12 and the step of forming the foregoing etching mask be performed at the same time. In this case, a frame to be used for forming the pole layer 12 and a frame to be used for forming the foregoing etching mask are preferably formed in the same photolithography step. On the other hand, in the case where the pole layer 12 is formed by etching a film to become the pole layer 12 through the use of an etching mask, it is preferred that the etching mask to be used for forming the pole layer 12 and the etching mask to be used for forming the RLG 60 be formed at the same time through the same photography step.

The remainder of configuration of the substructure 100 of the third embodiment is the same as that of the first embodiment.

The method of manufacturing the magnetic head and the method of manufacturing the substructure 100 of the third embodiment will now be described. The method of manufacturing the magnetic head and the method of manufacturing the substructure 100 of the third embodiment are the same as those of the first embodiment except the following. First, in the third embodiment, the RLGs 50 are not formed in the step of forming the read head portions (Step S101 of FIG. 9).

In the third embodiment, in the step of forming the write head portions (Step S104 of FIG. 9), each of the pole layers 12 is formed such that the actual position of the boundary between the track width defining portion 12A and the wide portion 12B coincides with the target position determined in Step S103 of FIG. 9, as in the first embodiment. In addition, in the step of forming the write head portions (Step S104), each of the RLGs 60 is formed such that the distance between the second end 60b of the RLG 60 and the foregoing target position taken in the direction orthogonal to the plane ABS is of a specific value D21.

In addition, in the third embodiment, in the step of forming the medium facing surface 20 (Step S106), the surface formed by cutting the substructure 100 is lapped so that the neck height NH reaches the target value $NH_{target}$ and the resistance of the MR film 5P reaches the target value $MRR_{target}$ by monitoring the resistance of the RLG 60 instead of the RLG 50 of the first embodiment. As a result, according to the third embodiment, it is possible to reduce variations in both resistance of the MR element 5 and the neck height NH of the pole layer 12.

Furthermore, according to the third embodiment, since the lapping is controlled using the RLGs 60 formed in the step of forming the write head portions, it is possible to control the neck height NH with higher accuracy compared with the case where the lapping is controlled using the RLGs 50 of the first embodiment.

The remainder of configuration, operation and effects of the third embodiment are similar to those of the first embodiment.

Fourth Embodiment

Figure 27:
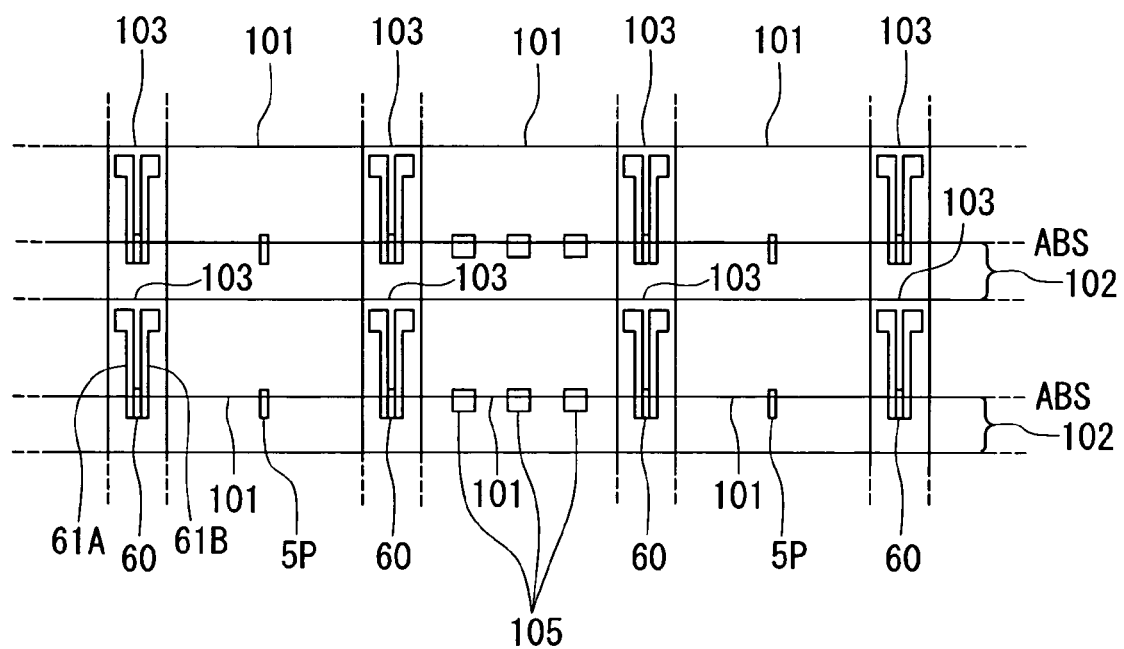
FIG. 27 is a view for illustrating part of a substructure of a fourth embodiment of the invention.

Reference is now made to FIG. 27 to describe a method of manufacturing a magnetic head and a method of manufacturing a substructure of a fourth embodiment of the invention. First, the substructure 100 of the fourth embodiment will be described with reference to FIG. 27. FIG. 27 is a view for illustrating part of the substructure 100 of the fourth embodiment. The substructure 100 of the fourth embodiment is the same as the substructure 100 of the third embodiment except the following. Specifically, the substructure 100 of the fourth embodiment incorporates, as in the second embodiment, a plurality of detection elements 105 each having a film configuration the same as that of the MR film 5P, and first and second electrodes disposed to sandwich the respective detection elements 105. Detailed descriptions of these components are the same as those provided in the second embodiment and are therefore omitted.

In the fourth embodiment, the value of a parameter having a correspondence with the resistance of the MR film 5P is detected through the use of the detection elements 105, and the target position of the boundary between the track width defining portion 12A and the wide portion 12B of the pole layer 12 is determined based on the value of the parameter detected.

The method of manufacturing the magnetic head and the method of manufacturing the substructure 100 of the fourth embodiment are the same as those of the second embodiment except the following. First, in the fourth embodiment, the RLGs 50 are not formed in the step of forming the read head portions (Step S201 of FIG. 23).

In the fourth embodiment, in the step of forming the write head portions (Step S204 of FIG. 23), each of the pole layers 12 is formed such that the actual position of the boundary between the track width defining portion 12A and the wide portion 12B coincides with the target position determined in Step S203 of FIG. 23, as in the second embodiment. In addition, in the step of forming the write head portions (Step S204), each of the RLGs 60 is formed such that the distance between the second end 60b of the RLG 60 and the foregoing target position taken in the direction orthogonal to the plane ABS is of a specific value D21.

In addition, in the fourth embodiment, in the step of forming the medium facing surface 20 (Step S206 of FIG. 23), the surface formed by cutting the substructure 100 is lapped so that the neck height NH reaches the target value $NH_{target}$ and the resistance of the MR film 5P reaches the target value $MRR_{target}$ by monitoring the resistance of the RLG 60 instead of the RLG 50 of the second embodiment. As a result, according to the fourth embodiment, it is possible to reduce variations in both resistance of the MR element 5 and the neck height NH of the pole layer 12.

The remainder of configuration, operation and effects of the fourth embodiment are similar to those of the second or third embodiment.

The present invention is not limited to the foregoing embodiments but may be practiced in still other ways. For example, in the first or third embodiment, the target position of the boundary between the track width defining portion 12A and the wide portion 12B may be determined in a manner similar to that of the second embodiment by obtaining the value of the resistance-area product of the MR film 5P from the resistance of the MR film 5P detected, and using this value of the resistance-area product in place of $RA_{wf}$ of Equation (4).

In the first or second embodiment, when lapping is performed to form the medium facing surface 20, the lapping may be controlled so that the resistance of the MR film 5P reaches to the target value $MRR_{target}$ by monitoring the resistance of the MR film 5P or by monitoring both the resistance of the RLG 50 and the resistance of the MR film 5P, instead of monitoring the resistance of the RLG 50.

In the third or fourth embodiment, when lapping is performed to form the medium facing surface 20, the lapping may be controlled so that the resistance of the MR film 5P reaches the target value $MRR_{target}$ by monitoring both the resistance of the RLG 60 and the resistance of the MR film 5P.

Furthermore, the substructure 100 may be provided with both the RLG 50 of the first or second embodiment and the RLG 60 of the third or fourth embodiment, and the lapping may be controlled so that the resistance of the MR film 5P reaches the target value $MRR_{target}$ by monitoring the resistance of at least one of the RLG 50 and RLG 60 or monitoring the resistance of the MR film 5P and the resistance of at least one of the RLG 50 and RLG 60.

The invention is applicable not only to magnetic heads for the perpendicular magnetic recording system but also to magnetic heads for the longitudinal magnetic recording system.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a magnetic head, the magnetic head comprising:

a medium facing surface that faces toward a recording medium;

a magnetoresistive element having an end located in the medium facing surface and reading data stored on the recording medium;

a coil that generates a magnetic field corresponding to data to be written on the recording medium; and a pole layer that allows a magnetic flux corresponding to the magnetic field generated by the coil to pass therethrough and generates a write magnetic field for writing the data on the recording medium, wherein the pole layer includes: a track width defining portion including a first end located in the medium facing surface and a second end located away from the medium facing surface, and having a width that defines a track width; and a wide portion coupled to the second end of the track width defining portion and having a width greater than that of the track width defining portion, the method comprising the steps of:

fabricating a magnetic head substructure in which a plurality of pre-head portions each of which will be the magnetic head later are aligned in a plurality of rows, by forming components of a plurality of magnetic heads on a substrate; and fabricating the plurality of magnetic heads by separating the pre-head portions from one another through cutting the substructure, wherein:

the step of fabricating the substructure includes the steps of:

forming a magnetoresistive film unlapped that will become the magnetoresistive element by undergoing lapping later;

detecting a resistance of the magnetoresistive film unlapped;

determining a target position of a boundary between the track width defining portion and the wide portion of the pole layer based on the detected resistance of the magnetoresistive film unlapped; and forming a pre-lapping pole layer that includes the track width defining portion unlapped and the wide portion and that will become the pole layer by undergoing lapping of the track width defining portion later, the pre-lapping pole layer being formed such that an actual position of the boundary between the track width defining portion and the wide portion coincides with the target position, the step of fabricating the magnetic heads includes the step of forming the medium facing surface by performing lapping of a surface formed by cutting the substructure;

in the step of forming the medium facing surface, the lapping of the surface formed by cutting the substructure includes lapping the magnetoresistive film and the track width defining portion of the pre-lapping pole layer simultaneously, and the lapping is performed such that the resistance of the magnetoresistive film reaches a predetermined value; and as a result of the lapping, the magnetoresistive film becomes the magnetoresistive element and the pre-lapping pole layer becomes the pole layer.

2. The method according to claim 1, wherein, in the step of detecting the resistance of the magnetoresistive film unlapped, the resistance of the magnetoresistive film unlapped is detected while a magnetic field is applied to the magnetoresistive film unlapped.

3. The method according to claim 1, wherein:

the magnetoresistive film includes: a pinned layer having a fixed direction of magnetization; a free layer having a direction of magnetization that changes in response to an external magnetic field; and a spacer layer disposed between the pinned layer and the free layer; and, in the step of detecting the resistance of the magnetoresistive film unlapped, the resistance of the magnetoresistive film unlapped is detected with the direction of magnetization of the free layer rendered parallel to the direction of magnetization of the pinned layer by applying a magnetic field to the magnetoresistive film unlapped.

4. The method according to claim 1, wherein:

the step of fabricating the substructure further includes the step of forming a resistor element having a resistance that changes in correspondence with the resistance of the magnetoresistive film in the step of forming the medium facing surface; and in the step of forming the medium facing surface, the lapping is performed such that the resistance of the magnetoresistive film reaches the predetermined value by monitoring the resistance of the resistor element.

5. The method according to claim 4, wherein the resistance of the resistor element in the step of forming the medium facing surface has a correspondence with a distance between the surface being lapped and the boundary between the track width defining portion and the wide portion.

6. A method of manufacturing a magnetic head, the magnetic head comprising:

a medium facing surface that faces toward a recording medium;

a magnetoresistive element having an end located in the medium facing surface and reading data stored on the recording medium;

a coil that generates a magnetic field corresponding to data to be written on the recording medium; and a pole layer that allows a magnetic flux corresponding to the magnetic field generated by the coil to pass therethrough and generates a write magnetic field for writing the data on the recording medium, wherein the pole layer includes: a track width defining portion including a first end located in the medium facing surface and a second end located away from the medium facing surface, and having a width that defines a track width; and a wide portion coupled to the second end of the track width defining portion and having a width greater than that of the track width defining portion, the method comprising the steps of:

fabricating a magnetic head substructure in which a plurality of pre-head portions each of which will be the magnetic head later are aligned in a plurality of rows, by forming components of a plurality of magnetic heads on a substrate; and fabricating the plurality of magnetic heads by separating the pre-head portions from one another through cutting the substructure, wherein:

the step of fabricating the substructure includes the steps of:
forming a magnetoresistive film unlapped that will become the magnetoresistive element by undergoing lapping later;
detecting a value of a parameter having a correspondence with a resistance of the magnetoresistive film unlapped;
determining a target position of a boundary between the track width defining portion and the wide portion of the pole layer based on the value of the parameter detected;
forming a pre-lapping pole layer that includes the track width defining portion unlapped and the wide portion and that will become the pole layer by undergoing lapping of the track width defining portion later, the pre-lapping pole layer being formed such that an actual position of the boundary between the track width defining portion and the wide portion coincides with the target position,
the step of fabricating the magnetic heads includes the step of forming the medium facing surface by performing lapping of a surface formed by cutting the substructure;
in the step of forming the medium facing surface, the lapping of the surface formed by cutting the substructure includes lapping the magnetoresistive film and the track width defining portion of the pre-lapping pole layer simultaneously, and the lapping is performed such that the resistance of the magnetoresistive film reaches a predetermined value; and
as a result of the lapping, the magnetoresistive film becomes the magnetoresistive element and the pre-lapping pole layer becomes the pole layer.

7. The method according to claim 6, wherein:
the step of fabricating the substructure further includes the step of forming a detection element having a resistance-area product equal to that of the magnetoresistive film unlapped; and
in the step of detecting the value of the parameter, a value of the resistance-area product of the detection element is detected as the value of the parameter.

8. The method according to claim 7, wherein, in the step of detecting the value of the resistance-area product of the detection element, the value of the resistance-area product of the detection element is detected while a magnetic field is applied to the detection element.

9. The method according to claim 7, wherein:
each of the magnetoresistive film and the detection element includes: a pinned layer having a fixed direction of magnetization; a free layer having a direction of magnetization that changes in response to an external magnetic field; and a spacer layer disposed between the pinned layer and the free layer; and
in the step of detecting the value of the resistance-area product of the detection element, the value of the resistance-area product of the detection element is detected with the direction of magnetization of the free layer rendered parallel to the direction of magnetization of the pinned layer by applying a magnetic field to the detection element.

10. The method according to claim 6, wherein:
the step of fabricating the substructure further includes the step of forming a resistor element having a resistance that changes in correspondence with the resistance of the magnetoresistive film in the step of forming the medium facing surface; and
in the step of forming the medium facing surface, the lapping is performed such that the resistance of the magnetoresistive film reaches the predetermined value by monitoring the resistance of the resistor element.

11. The method according to claim 10, wherein the resistance of the resistor element in the step of forming the medium facing surface has a correspondence with a distance between the surface being lapped and the boundary between the track width defining portion and the wide portion.

12. A method of manufacturing a magnetic head substructure used for manufacturing a magnetic head, the magnetic head comprising:
a medium facing surface that faces toward a recording medium;
a magnetoresistive element having an end located in the medium facing surface and reading data stored on the recording medium;
a coil that generates a magnetic field corresponding to data to be written on the recording medium; and
a pole layer that allows a magnetic flux corresponding to the magnetic field generated by the coil to pass therethrough and generates a write magnetic field for writing the data on the recording medium, wherein:
the pole layer includes: a track width defining portion including a first end located in the medium facing surface and a second end located away from the medium facing surface, and having a width that defines a track width; and a wide portion coupled to the second end of the track width defining portion and having a width greater than that of the track width defining portion; and
the substructure is one in which a plurality of pre-head portions each of which will be the magnetic head later are aligned in a plurality of rows, and the substructure is to be cut later so that the plurality of pre-head portions will be separated from one another and so that the medium facing surface will be formed by lapping a surface formed by cutting the substructure,
the method of manufacturing the substructure comprising the step of forming components of a plurality of magnetic heads on a substrate so that the pre-head portions are aligned in a plurality of rows,
wherein the step of forming the components of the plurality of magnetic heads includes the steps of:
forming a magnetoresistive film unlapped that will be lapped later so that a resistance thereof reaches a predetermined value and that will become the magnetoresistive element;
detecting the resistance of the magnetoresistive film unlapped;
determining a target position of a boundary between the track width defining portion and the wide portion of the pole layer based on the detected resistance of the magnetoresistive film unlapped; and
forming a pre-lapping pole layer that includes the track width defining portion unlapped and the wide portion and that will become the pole layer by undergoing lapping of the track width defining portion later, the pre-lapping pole layer being formed such that an actual position of the boundary between the track width defining portion and the wide portion coincides with the target position.

13. The method according to claim 12, wherein, in the step of detecting the resistance of the magnetoresistive film unlapped, the resistance of the magnetoresistive film unlapped is detected while a magnetic field is applied to the magnetoresistive film unlapped.

14. The method according to claim 12, wherein:
the magnetoresistive film includes: a pinned layer having a fixed direction of magnetization; a free layer having a direction of magnetization that changes in response to an external magnetic field; and a spacer layer disposed between the pinned layer and the free layer; and in the step of detecting the resistance of the magnetoresistive film unlapped, the resistance of the magnetoresistive film unlapped is detected with the direction of magnetization of the free layer rendered parallel to the direction of magnetization of the pinned layer by applying a magnetic field to the magnetoresistive film unlapped.

15. The method according to claim 12, wherein the step of forming the components of the plurality of magnetic heads further includes the step of forming a resistor element having a resistance that changes in correspondence with the resistance of the magnetoresistive film when lapping is performed on the surface formed by cutting the substructure later.

16. The method according to claim 15, wherein the resistance of the resistor element when lapping is performed on the surface formed by cutting the substructure has a correspondence with a distance between the surface being lapped and the boundary between the track width defining portion and the wide portion.

17. A method of manufacturing a magnetic head substructure used for manufacturing a magnetic head, the magnetic head comprising:

a medium facing surface that faces toward a recording medium;

a magnetoresistive element having an end located in the medium facing surface and reading data stored on the recording medium;

a coil that generates a magnetic field corresponding to data to be written on the recording medium; and a pole layer that allows a magnetic flux corresponding to the magnetic field generated by the coil to pass therethrough and generates a write magnetic field for writing the data on the recording medium, wherein:

the pole layer includes: a track width defining portion including a first end located in the medium facing surface and a second end located away from the medium facing surface, and having a width that defines a track width; and a wide portion coupled to the second end of the track width defining portion and having a width greater than that of the track width defining portion; and the substructure is one in which a plurality of pre-head portions each of which will be the magnetic head later are aligned in a plurality of rows, and the substructure is to be cut later so that the plurality of pre-head portions will be separated from one another and so that the medium facing surface will be formed by lapping a surface formed by cutting the substructure, the method of manufacturing the substructure comprising the step of forming components of a plurality of magnetic heads on a substrate so that the pre-head portions are aligned in a plurality of rows, wherein the step of forming the components of the plurality of magnetic heads includes the steps of:

forming a magnetoresistive film unlapped that will be lapped later so that a resistance thereof reaches a predetermined value and that will become the magnetoresistive element;

detecting a value of a parameter having a correspondence with the resistance of the magnetoresistive film unlapped;

determining a target position of a boundary between the track width defining portion and the wide portion of the pole layer based on the value of the parameter detected; and forming a pre-lapping pole layer that includes the track width defining portion unlapped and the wide portion and that will become the pole layer by undergoing lapping of the track width defining portion later, the pre-lapping pole layer being formed such that an actual position of the boundary between the track width defining portion and the wide portion coincides with the target position.

18. The method according to claim 17, wherein:

the step of forming the components of the plurality of magnetic heads further includes the step of forming a detection element having a resistance-area product equal to that of the magnetoresistive film unlapped; and in the step of detecting the value of the parameter, a value of the resistance-area product of the detection element is detected as the value of the parameter.

19. The method according to claim 18, wherein, in the step of detecting the value of the resistance-area product of the detection element, the value of the resistance-area product of the detection element is detected while a magnetic field is applied to the detection element.

20. The method according to claim 18, wherein:

each of the magnetoresistive film and the detection element includes: a pinned layer having a fixed direction of magnetization; a free layer having a direction of magnetization that changes in response to an external magnetic field; and a spacer layer disposed between the pinned layer and the free layer; and in the step of detecting the value of the resistance-area product of the detection element, the value of the resistance-area product of the detection element is detected with the direction of magnetization of the free layer rendered parallel to the direction of magnetization of the pinned layer by applying a magnetic field to the detection element.

21. The method according to claim 17, wherein the step of forming the components of the plurality of magnetic heads further includes the step of forming a resistor element having a resistance that changes in correspondence with the resistance of the magnetoresistive film when lapping is performed on the surface formed by cutting the substructure later.

22. The method according to claim 21, wherein the resistance of the resistor element when lapping is performed on the surface formed by cutting the substructure has a correspondence with a distance between the surface being lapped and the boundary between the track width defining portion and the wide portion.

* * * * *